(12) United States Patent
Hamada et al.

(10) Patent No.: US 8,200,066 B2
(45) Date of Patent: Jun. 12, 2012

(54) RECORDING MEDIUM, REPRODUCING APPARATUS AND METHOD USING PERSONAL IDENTIFICATION NUMBER

(75) Inventors: Toshiya Hamada, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/181,769

(22) Filed: Jul. 13, 2011

(65) Prior Publication Data

US 2011/0274408 A1 Nov. 10, 2011

Related U.S. Application Data

(63) Continuation of application No. 12/658,089, filed on Feb. 2, 2010, now Pat. No. 8,098,979, which is a continuation of application No. 10/450,216, filed as application No. PCT/JP02/10724 on Oct. 16, 2002, now Pat. No. 7,684,674.

(30) Foreign Application Priority Data

Oct. 16, 2001 (JP) ................................ P2001-317910

(51) Int. Cl.
H04N 9/80 (2006.01)

(52) U.S. Cl. ...................................... 386/248; 369/53.2

(58) Field of Classification Search .................. 386/248, 386/249, 250–262; 369/53.2, 53.41, 53.42; 707/999.107, 999.001, 999.003
See application file for complete search history.

(56) References Cited

U.S. PATENT DOCUMENTS

| | | | |
|---|---|---|---|
| 5,729,516 | A | 3/1998 | Tozaki et al. |
| 7,236,687 | B2 | 6/2007 | Kato et al. |
| 7,437,055 | B2 | 10/2008 | Hamada et al. |
| 7,477,833 | B2 | 1/2009 | Kato et al. |
| 2002/0135607 | A1 | 9/2002 | Kato et al. |
| 2002/0135608 | A1 | 9/2002 | Hamada et al. |
| 2002/0145702 | A1 | 10/2002 | Kato et al. |
| 2002/0150383 | A1 | 10/2002 | Kato et al. |
| 2002/0164152 | A1 | 11/2002 | Kato et al. |
| 2003/0103604 | A1 | 6/2003 | Kato et al. |
| 2005/0105888 | A1* | 5/2005 | Hamada et al. ............... 386/230 |
| 2005/0196143 | A1* | 9/2005 | Kato et al. .................... 386/201 |
| 2007/0183750 | A1 | 8/2007 | Hamada et al. |
| 2007/0189727 | A1* | 8/2007 | Hamada et al. ............... 386/241 |
| 2007/0286577 | A1 | 12/2007 | Kato et al. |
| 2010/0254676 | A1* | 10/2010 | Ebato ............................ 386/248 |

FOREIGN PATENT DOCUMENTS

EP 737874 10/1996

(Continued)

*Primary Examiner* — Tan X Dinh
(74) *Attorney, Agent, or Firm* — Lerner, David, Littenberg, Krumholz & Mentlik, LLP

(57) ABSTRACT

The present invention relates to a reproducing apparatus and a reproducing method. A code number is inputted. First control information is reproduced in an info file for controlling reproduction of all of a plurality of playlists recorded on a recording medium. Second control information is reproduced in a playlist for controlling reproduction of the playlist. The reproduction of data is permitted, even when the first control information and the second control information are both active, if the inputted code number is consistent with a personal identification number (PIN) which is recorded in the info file, without requiring another input of the code number. Display of information in a playlist is controlled and the display of the information in the playlist is prohibited when the first control information or the second control information is active.

7 Claims, 25 Drawing Sheets

FOREIGN PATENT DOCUMENTS

| | | |
|---|---|---|
| EP | 911825 | 4/1999 |
| EP | 1 103 974 A2 | 5/2001 |
| GB | 2356485 | 5/2001 |
| JP | 07-334645 A | 12/1995 |
| JP | 09-245438 A | 9/1997 |
| JP | 9-259235 A1 | 10/1997 |
| JP | 10293664 | 11/1998 |
| JP | 10-322529 A1 | 12/1998 |
| JP | 11-296978 A | 10/1999 |
| JP | 2000013720 | 1/2000 |
| JP | 2000-059555 A | 2/2000 |
| JP | 2000-105788 A1 | 4/2000 |
| JP | 2000-163882 A1 | 6/2000 |
| JP | 2000-255119 A | 9/2000 |
| JP | 2000-259569 A | 9/2000 |
| JP | 2001-22676 A1 | 1/2001 |
| JP | 2001-51987 A1 | 2/2001 |
| JP | 2001-157145 A1 | 6/2001 |
| JP | 2001-209585 A | 8/2001 |
| JP | 2001-249784 A1 | 9/2001 |
| JP | 2001-268510 A | 9/2001 |
| JP | 2002-314929 A | 10/2002 |
| WO | 01/82606 | 11/2001 |

* cited by examiner

F I G. 2
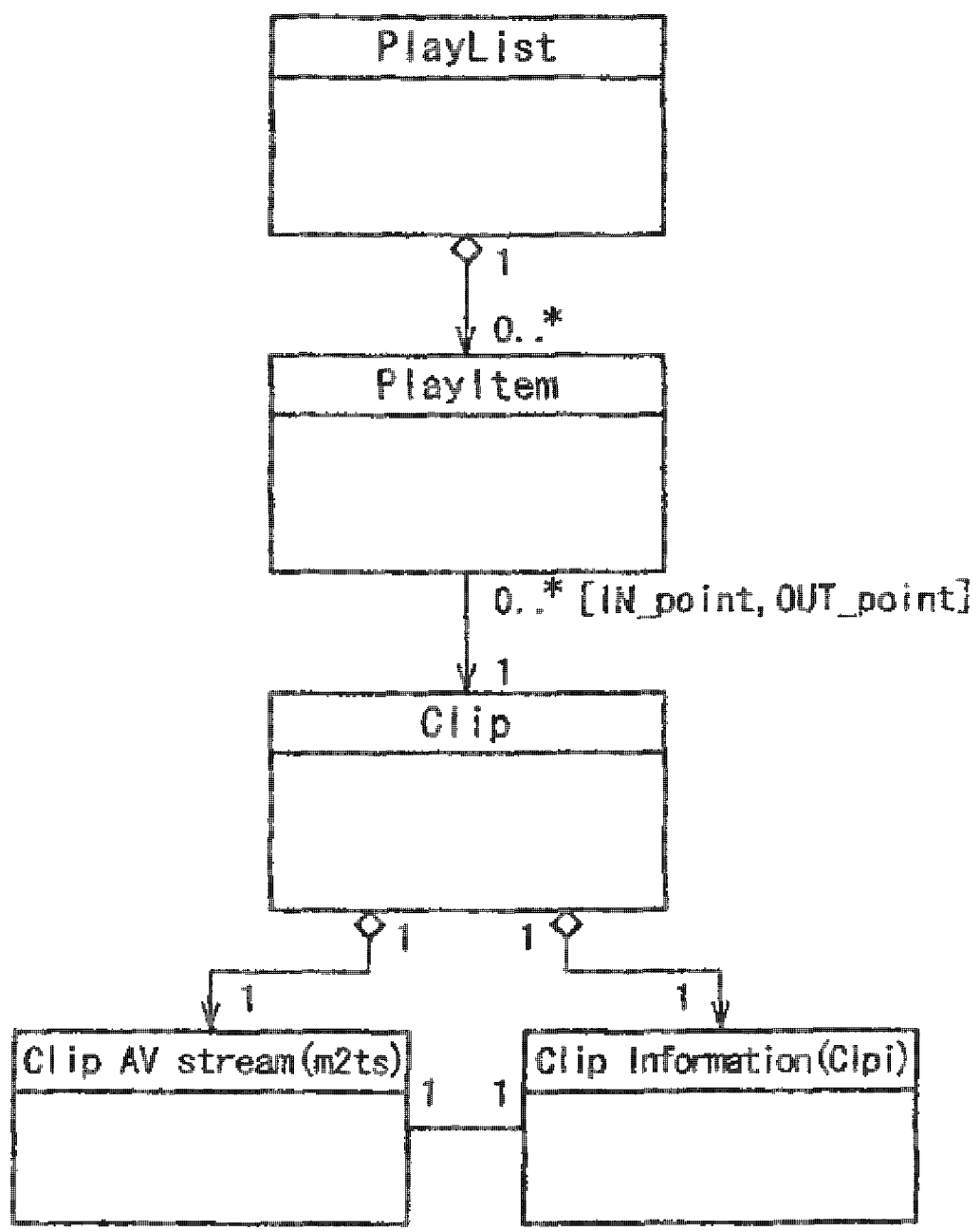

F I G. 3
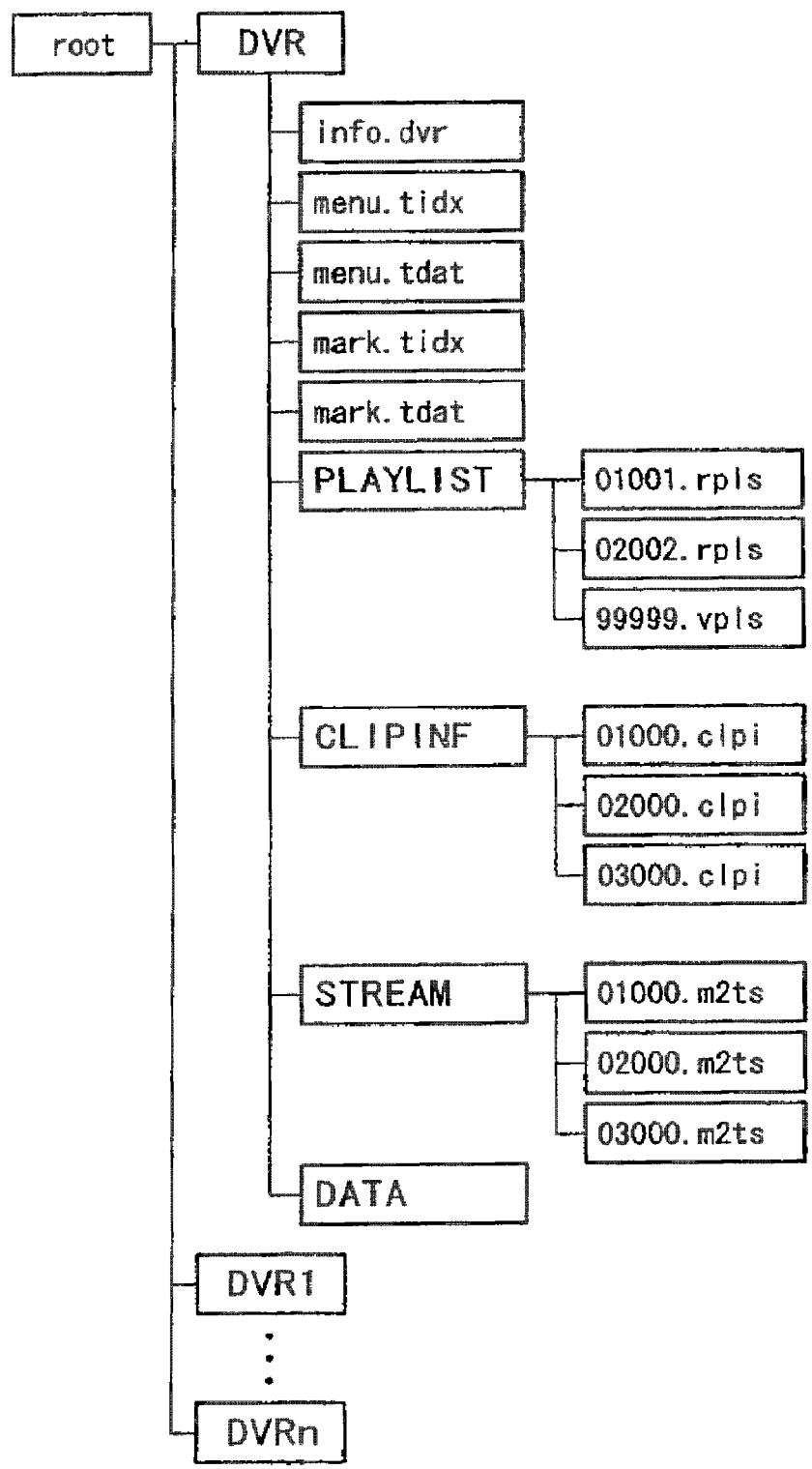

F I G. 4

| Syntax | No.of bits | Mnemonics |
|---|---|---|
| info.dvr{ | | |
|     version_number | 8*4 | bslbf |
|     TableOfPlayLists_Start_address | 32 | uimsbf |
|     MakerPrivateData_Start_address | 32 | uimsbf |
|     reserved_for_future_use | 192 | bslbf |
|     UIAppInfoDVR() | | |
|     for(i=0;i<N1;i++){ | | |
|         padding_word | 16 | bslbf |
|     } | | |
|     TableOfPlayLists() | | |
|     for(i=0;i<N2;i++){ | | |
|         padding_word | 16 | bslbf |
|     } | | |
|     MakersPrivateData() | | |
|     for(i=0;i<N3;i++){ | | |
|         padding_word | 16 | bslbf |
|     } | | |
| } | | |

FIG. 5

| Syntax | No.of bits | Mnemonics |
|---|---|---|
| UIAppInfoDVR(){ | | |
|     length | 32 | uimsbf |
|     reserved_for_future_use | 16 | bslbf |
|     DVR_character_set | 8 | bslbf |
|     reserved_for_word_align | 6 | bslbf |
|     DVR_protect_flag | 1 | bslbf |
|     resume_valid_flag | 1 | bslbf |
|     PIN | 8*4 | bslbf |
|     resume_PlayList_file_nama | 8*10 | bslbf |
|     ref_to_menu_thumbnail_index | 16 | uimsbf |
|     DVR_name_length | 8 | uimsbf |
|     DVR_name | 8*256 | bslbf |
| } | | |

F I G. 6

| Syntax | No.of bits | Mnemonics |
|---|---|---|
| TableOfPlayLists(){ | | |
|     length | 32 | uimsbf |
|     number_of_PlayLists | 16 | uimsbf |
|     for(i=0;i<number_of_PlayLists;i++){ | | |
|         PlayList_file_name | 8*10 | bslbf |
|     } | | |
| } | | |

FIG. 7

| Syntax | No.of bits | Mnemonics |
|---|---|---|
| xxxxx.rpls / yyyyy.vpls{ | | |
|     version_number | 8*4 | bslbf |
|     PlayList_start_address | 32 | uimsbf |
|     PlayListMark_start_address | 32 | uimsbf |
|     MakersPrivateData_Start_address | 32 | uimsbf |
|     reserved_for_future_use | 160 | bslbf |
|     UIAppInfoPlayList() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
|     MakersPrivateData() | | |
|     for(i=0;i<N4;i++){ | | |
|         padding_word | 16 | bslbf |
|     } | | |
| } | | |

FIG. 8

| Syntax | No.of bits | Mnemonics |
|---|---|---|
| UIAppInfoPlayList(){ | | |
|     length | 32 | uimsbf |
|     PlayList_character_set | 8 | uimsbf |
|     reserved_for_word_align | 3 | bslbf |
|     Playback_control_flag | 1 | uimsbf |
|     write_protect_flag | 1 | uimsbf |
|     is_played_flag | 1 | uimsbf |
|     archive | 2 | uimsbf |
|     record_time_and_date | 4*14 | bslbf |
|     PlayList_duration | 4*6 | bslbf |
|     maker_ID | 16 | uimsbf |
|     maker_model_code | 16 | uimsbf |
|     ref_to_thumbnail_index | 16 | uimsbf |
|     channel_number | 16 | uimsbf |
|     reserved_for_word_align | 8 | bslbf |
|     channel_name_length | 8 | uimsbf |
|     channel_name | 8*20 | bslbf |
|     PlayList_name_length | 8 | uimsbf |
|     PlayList_name | 8*255 | bslbf |
|     PlayList_detail_length | 16 | uimsbf |
|     PlayList_detail | 8*1200 | bslbf |
| } | | |

FIG. 9

| Syntax | No. of bits | Mnemonics |
|---|---|---|
| PlayList(){ | | |
|     length | 32 | uimsbf |
|     reserved_for_word_align | 15 | bslbf |
|     CPI_type | 1 | bslbf |
|     number_of_PlayItems | 16 | uimsbf |
|     if(<Virtual-PlayList>&&CPI_type==0){ | | |
|         number_of_SubPlayItems | 16 | uimsbf |
|     }else{ | | |
|         reserved_for_word_align | 16 | bslbf |
|     } | | |
|     for(PlayItem_id=0;<br>        PlayItem_id<number_of_PlayItems;<br>        PlayItem_id++){ | | |
|         PlayItem() | | |
|     } | | |
|     if(<Virtual-PlayList>&&CPI_type==0){ | | |
|         for(i=0;i<number_of_SubPlayItems;i++){ | | |
|         SubPlayItem() | | |
|         } | | |
|     } | | |
| } | | |

F I G. 10

| Syntax | No.of bits | Mnemonics |
|---|---|---|
| PlayItem(){ | | |
|     length | 32 | uimsbf |
|     Clip_Information_file_name | 8*10 | bslbf |
|     reserved_for_word_align | 6 | bslbf |
|     connection_condition | 2 | bslbf |
|     if(CPI_type==0){ | | |
|         ref_to_STC_id | 8 | uimsbf |
|     }else{ | | |
|         reserved_for_word_align | 8 | bslbf |
|     } | | |
|     IN_time | 32 | uimsbf |
|     OUT_time | 32 | uimsbf |
|     if(<Virtual-PlayList>&&connection_condition=='10'){ | | |
|         BridgeSequenceInfo() | | |
|     } | | |
| } | | |

F I G. 1 2

| Syntax | No.of bits | Mnemonics |
|---|---|---|
| PlayListMark(){ | | |
|     length | 32 | uimsbf |
|     number_of_PlayList_Marks | 16 | uimsbf |
|     for(i=0;i<number_of_PlayList_marks;i++){ | | |
|         mark_invalid_flag | 1 | uimsbf |
|         mark_type | 7 | uimsbf |
|         mark_name_length | 8 | uimsbf |
|         ref_to_PlayItem_id | 16 | uimsbf |
|         mark_time_stamp | 32 | uimsbf |
|         entry_ES_PID | 16 | uimsbf |
|         ref_to_thumbnail_index | 16 | uimsbf |
|         mark_name | 8*32 | bslbf |
|     } | | |
| } | | |

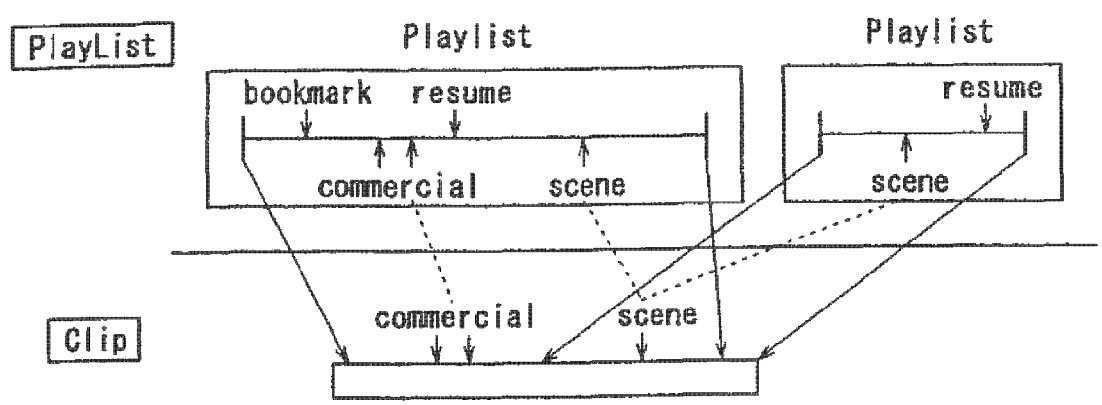
F I G. 1 3

F I G. 1 4

| Syntax | No.of bits | Mnemonics |
|---|---|---|
| zzzzz.clpi{ | | |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     MakersPrivateData_start_address | 32 | uimsbf |
|     reserved_for_future_use | 96 | bslbf |
|     ClipInfo() | | |
|     for(i=0;i<N1;i++){ | | |
|         padding_word | 16 | bslbf |
|     } | | |
|     SequenceInfo() | | |
|     for(i=0;i<N2;i++){ | | |
|         padding_word | 16 | bslbf |
|     } | | |
|     ProgramInfo() | | |
|     for(i=0;i<N3;i++){ | | |
|         padding_word | 16 | bslbf |
|     } | | |
|     CPI() | | |
|     for(i=0;i<N4;i++){ | | |
|         padding_word | 16 | bslbf |
|     } | | |
|     ClipMark() | | |
|     for(i=0;i<N5;i++){ | | |
|         padding_word | 16 | bslbf |
|     } | | |
|     MakerPrivateDate() | | |
|     for(i=0;i<N6;i++){ | | |
|         padding_word | 16 | bslbf |
|     } | | |
| } | | |

FIG. 15

| | (A) | (B) | (C) | (D) |
|---|---|---|---|---|
| DVR_protect_flag | 0 | 1 | 0 | 1 |
| playback_control_flag | 0 | 0 | 1 | 1 |
| EXAMPLE OF USE | (1) DISK WITHOUT REPRODUCTION CONTROL (2) WHEN DISK IS USED BY USER ALONE | (1) WHEN DISK IS DESIRED TO BE FOR EXCLUSIVE USE OF USER SO THAT NO OTHER PERSON CAN SEE DISK (2) WHEN DISK IS USED AS MULTI-USER DISK | (1) WHEN UNNECESSARY PLAYLIST IS NOT DESIRED TO BE DISPLAYED (2) WHEN DISK IS GIVEN TO ANOTHER PERSON AND ONLY PLAYLISTS DESIRED BY CREATOR TO BE SHOWN ARE TO BE DISPLAYED | SITUATION OF (B) AND (C) |

"0" INDICATES THAT REPRODUCTION IS ALLOWED AND
"1" INDICATES THAT REPRODUCTION IS NOT ALLOWED

FIG. 19

```
CODE NUMBER INPUT
┌─────────────────────────────────────────┬─────────┐
│                                         │ ENTER   │
│  THIS DIRECTORY IS LOCKED.              │         │
│  INPUT CODE NUMBER TO RELEASE LOCK.     │ CANCEL  │
│                                         │         │
│     CODE NUMBER   1   2   3   4         │         │
│                                         │         │
│  SELECT BY ↑↓→←                         │         │
│  PRESS [ENTER] BUTTON TO EFFECT INPUT   │         │
└─────────────────────────────────────────┴─────────┘
```

F I G. 2 2

| | SELECT PLAYLIST TO BE REPRODUCED | | |
|---|---|---|---|
| 1 | DRAMA (6) | 2001/08/29 | LATEST |
| 2 | PROFESSIONAL BASEBALL RELAY BROADCAST 50TH GAME | 2001/08/20 | UNVIEWED |
| 3 | ************************ | ********** | LOCKED |
| 4 | FOREIGN-FILM THEATER | 2001/08/22 | FAVORITE RECORDING |

↓ CONTINUED TO NEXT PAGE

| DIRECTORY SELECTION | INITIAL SETTING |
|---|---|
| EJECT DISK | EXIT MENU |

SELECT BY ↑ ↓
PRESS [ENTER] TO EFFECT SELECTION

RECORDING MEDIUM, REPRODUCING APPARATUS AND METHOD USING PERSONAL IDENTIFICATION NUMBER

CROSS-REFERENCE TO RELATED APPLICATIONS

This application is a continuation of U.S. application Ser. No. 12/658,089, filed on Feb. 2, 2010, which is a continuation of U.S. application Ser. No. 10/450,216, filed on Feb. 11, 2004, which is a national phase entry under 35 U.S.C. §371 of International Application No. PCT/JP2002/010724, filed Oct. 16, 2002, published on Apr. 24, 2003 as WO/2003/034429, which claims priority from Japanese Patent Application No. JP 2001-317910 filed in the Japanese Patent Office on Oct. 16, 2001, the disclosures of which are hereby incorporated herein by reference.

BACKGROUND OF THE INVENTION

1. Technical Field

The present invention relates to an apparatus and a method for reproducing a recording medium, and particularly to an apparatus and a method for reproducing a recording medium that make it possible to control reproduction by a simple operation by recording flags for controlling reproduction of AV data onto a disk and using the flags at the time of the reproduction.

2. Background Art

Various optical disks have recently been proposed as disk type recording media that are recordable and removable from a recording and reproducing apparatus. Such recordable optical disks are proposed as large-capacity media having a capacity of a few gigabytes or more, and receive high expectations as media for recording AV (Audio Visual) signals such as video signals and the like.

As a source (source of supply) of digital AV signals recorded on the recordable optical disks, there is digital satellite broadcasting typified by CS (Communication Satellite) digital broadcasting and BS (Broadcasting Satellite) digital broadcasting in Japan, for example. In addition, digital terrestrial television broadcasting and the like are being considered for the future.

Digital video signals supplied from these sources are typically video-compressed by an MPEG (Moving Picture Experts Group)-2 Video system. Also, in a recording apparatus, a recording rate specific to the apparatus is generally determined. When a digital video signal from a digital broadcast is recorded on conventional video storage media for consumer use, in an analog recording system, the digital video signal is decoded, subjected to digital-to-analog conversion and band limitation, and recorded. In a digital recording system such as an MPEG-1 Video system, an MPEG-2 Video system, a DV (Digital Video) system or the like, on the other hand, the digital video signal is decoded by a tuner, then re-encoded using an encoding system and a recording rate specific to the recording apparatus, and recorded.

However, such recording methods involve degradation in picture quality because the supplied bit stream is decoded, thereafter subjected to band limitation or re-encoding, and then recorded. When a video-compressed digital signal is recorded and a transmission rate of the video-compressed digital signal exceeds a recording rate of the disk, the recording and reproducing apparatus needs to decode the digital signal, thereafter re-encode the digital signal so as to decrease the transmission rate to an upper limit of the recording rate of the disk or lower, and then record the digital signal. However, when the transmission rate of the input digital signal does not exceed the recording rate of the recording and reproducing apparatus, the degradation in picture quality is minimized by a method of recording the supplied bit stream as it is without decoding or re-encoding the bit stream.

Digital signals are characterized in that the transmission rate is not always constant. When a digital signal is transmitted by a variable rate system in which the bit rate of the digital signal fluctuates with time, a tape recording system having a fixed recording rate because of a fixed rotational speed of a rotary head maintains a constant bit rate at all times by stuffing empty packets, for example. This means recording at a maximum bit rate at all times and hence wasteful consumption of recording capacity. On the other hand, a disk recording apparatus temporarily stores data in a buffer, and records the data onto a disk on a burst and an intermittent basis. Hence, the disk recording apparatus eliminates the need for inserting empty packets, and can therefore use capacity on a recording medium less wastefully.

Thus, a recording and reproducing apparatus that records a digital broadcast signal as it is without decoding or re-encoding the digital broadcast signal as with a data streamer and uses a disk as a recording medium is expected to be desired in the future when digital broadcasting will become mainstream.

In the present invention, a unit in which a user selects and reproduces AV data (a unit in which the user tacitly expects reproduction to be performed continuously) is referred to as a playlist. A simplest example of the playlist is continuous video (contents) from a start of recording to an end of the recording.

A function of preventing an entire disk or playlists recorded on the disk from being readily reproduced is considered. A mechanism that sets a code number and does not allow reproduction unless the code number is inputted is useful when there are contents not desired to be viewed by others and when there is a playlist not desired to be changed.

BRIEF SUMMARY OF THE INVENTION

Disclosure of Invention

It is an object of the present invention to enable the reproduction control by a simple operation.

According to the present invention, there is provided a recording medium reproducing apparatus characterized by comprising: setting means for setting first control information for controlling reproduction of information in each directory which information is recorded on a recording medium and second control information for controlling reproduction of each reproduction list belonging to the directory; input means for inputting a code number; and determining means for determining, when the first control information and the second control information are both active, on the basis of input of the code number for either of the first control information or the second control information, whether input of the code number for the other control information is required or not.

The recording medium can have a plurality of directories and the code number can be set in each of the directories.

The reproduction list can be a Playlist.

The recording medium reproducing apparatus can further include display control means for controlling display of information on the directory or the reproduction list, wherein the display control means can prohibit display of the information on the directory or the reproduction list when the first control information or the second control information is active.

The recording medium reproducing apparatus can further include display control means for controlling display of information on the directory or the reproduction list, wherein the display control means can display the information on the directory or the reproduction list so as not to allow selection thereof when the first control information or the second control information is active.

The recording medium reproducing apparatus can further include display control means for controlling display of information on the directory or the reproduction list, wherein the display control means can display the information on the directory or the reproduction list in hidden characters when the first control information or the second control information is active.

The recording medium reproducing apparatus can further include display control means for controlling display of information on a recordable capacity of the recording medium, wherein when information whose first control information, second control information is active is recorded on the recording medium, the display control means can control display of the information on the recordable capacity such that the recordable capacity does not include a capacity occupied by the information whose first control information or second control information is active.

According to the present invention, there is provided a recording medium reproducing method characterized by comprising: a setting step for setting first control information for controlling reproduction of information in each directory which information is recorded on a recording medium and second control information for controlling reproduction of each reproduction list belonging to the directory; an input step for inputting a code number; and a determining step for determining, when the first control information and the second control information are both active, on the basis of input of the code number for either of the first control information or the second control information, whether input of the code number for the other control information is required or not.

According to the present invention, there is provided a program on a recording medium, the program characterized by comprising: a setting step for setting first control information for controlling reproduction of information in each directory which information is recorded on the recording medium and second control information for controlling reproduction of each reproduction list belonging to the directory; an input step for inputting a code number; and a determining step for determining, when the first control information and the second control information are both active, on the basis of input of the code number for either of the first control information or the second control information, whether input of the code number for the other control information is required or not.

According to the present invention, there is provided a program executed by a computer, the program characterized by comprising: a setting step for setting first control information for controlling reproduction of information in each directory which information is recorded on a recording medium and second control information for controlling reproduction of each reproduction list belonging to the directory; an input step for inputting a code number; and a determining step for determining, when the first control information and the second control information are both active, on the basis of input of the code number for either of the first control information or the second control information, whether input of the code number for the other control information is required or not.

According to the present invention, there is provided a recording medium having information recorded thereon, the recording medium characterized in that first control information for controlling reproduction of the recorded information in each directory, second control information for controlling reproduction of each reproduction list belonging to the directory, and a code number corresponding to each of a plurality of directories are recorded.

With the recording medium reproducing apparatus and method, the recording medium, and the program according to the present invention, when first control information for controlling reproduction of information in each directory which information is recorded on the recording medium and second control information for controlling reproduction of each reproduction list belonging to the directory are both active, on the basis of input of a code number for either of the first control information and the second control information, input of the code number for the other control information is determined.

On the recording medium according to the present invention, first control information for controlling reproduction of recorded information in each directory, second control information for controlling reproduction of each reproduction list belonging to the directory, and a code number corresponding to each of a plurality of directories are recorded.

BRIEF DESCRIPTION OF THE DRAWINGS

FIG. 2 is a UML diagram showing a structure for managing an AV stream;

FIG. 3 is a diagram showing a directory structure of a DVR system;

FIG. 4 is a diagram of assistance in explaining info.dvr;

FIG. 5 is a diagram of assistance in explaining UIAppInfoDVR( );

FIG. 6 is a diagram of assistance in explaining TableOfPlayList( );

FIG. 7 is a diagram of assistance in explaining a PlayList file;

FIG. 8 is a diagram of assistance in explaining UIAppInfoPlayList( );

FIG. 9 is a diagram of assistance in explaining PlayList( );

FIG. 10 is a diagram of assistance in explaining PlayItem( );

FIG. 12 is a diagram of assistance in explaining PlayListMark( );

FIG. 13 is a diagram of assistance in explaining marks;

FIG. 14 is a diagram of assistance in explaining a Clip file;

FIG. 15 is a diagram of assistance in explaining combinations of flags;

FIG. 19 is a diagram showing an example of a code number input screen;

FIG. 22 is a diagram showing an example of display of a menu screen for PlayList selection;

DETAILED DESCRIPTION

Best Mode for Carrying Out the Invention

A bit stream encoded by an encoding method such as MPEG Video, MPEG Audio and the like and multiplexed according to MPEG-2 Systems, and converted to a form of a file handled by a file system and then recorded on a disk is referred to as an AV (Audio Video) stream file (or a Clip AV stream).

Figure 1:
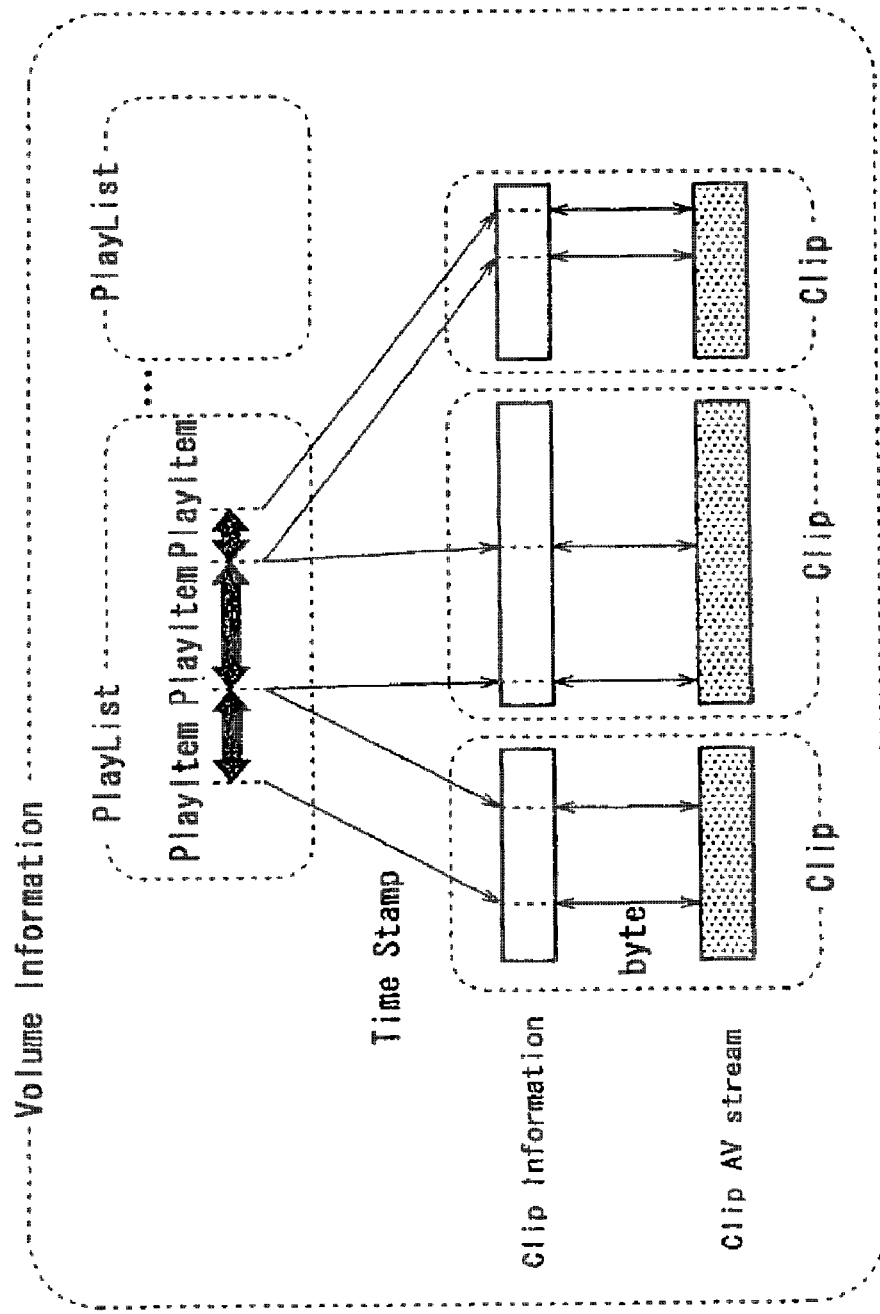
FIG. 1 is a diagram showing a relation between Clips and Playlists.

A mechanism of reproduction sequence specification that specifies a part or an entire range of such an AV stream file to thereby reproduce a sequence of only necessary parts will be described. As shown in FIG. 1, a reproduction sequence specification that specifies a part or an entire range of an AV stream file to thereby reproduce only necessary parts is a PlayList. The PlayList as a reproduction list is a combined unit of video and audio as viewed from a user. The unit is simplest when formed from a start of recording to an end of the recording, and this unit forms one PlayList when editing is not performed.

The PlayList includes a specification of an AV stream file or a specification of which AV stream to reproduce, and a set of a reproduction start point and a reproduction end point in the file. The information of the specification of the AV stream file, the reproduction start point (IN point), and the reproduction end point (OUT point) forms a set, which is referred to as a PlayItem. Then the PlayList can be said to be formed of a set of PlayItems.

As shown in FIG. 1, a PlayItem refers to a range specified by an IN point and an OUT point of an AV stream file. Reproducing the PlayItem means reproducing a part of the AV stream that the PlayItem refers to.

The AV stream is a bit stream multiplexed in a form of an MPEG-2 TS (Transport Stream) or the like. A file separate from a file having the AV stream recorded therein retains information (Clip information) in a one-to-one correspondence with the bit stream. This is to facilitate reproduction and editing. The Clip information and the AV stream are considered to be one object, which is referred to as a Clip. That is, the Clip is an object comprising the AV stream and the information associated therewith.

FIG. 2 shows a relation between the AV stream file, the Clip, the PlayItem, and the PlayList as described above in UML (Unified Modeling Language). An arrow having a rhombus at a starting point thereof and connecting the PlayList with the PlayItem, and a number adjacent to the rhombus indicate that "one PlayList includes more than zero PlayItems."

The PlayItem and the Clip are connected to each other by an arrow without a rhombus, and a one-to-many relation between the Clip and the PlayItem is indicated by a number (* is an arbitrary number and 0 . . . * denotes an arbitrary number). This indicates that more than zero PlayItems specifying a range in one Clip by a set of an IN_point and an OUT_point are created from the Clip. One Clip includes one Clip AV stream and one piece of Clip Information serving as Clip attribute information. A line connecting the Clip AV stream with the Clip Information indicates a one-to-one correspondence of a stream file with an extension m2ts and the Clip Information as the Clip attribute information with an extension clpi. The definition of such a structure enables so-called nondestructive reproduction sequence specification for reproducing only arbitrary parts without changing the AV stream file.

Files on a recording medium (media) where various information is recorded and reproduced, for realizing the present invention, will next be described. As shown in FIG. 3, the following six kinds of files are recorded under a DVR directory.

(1) info.dvr: A file storing information on the directory as a whole.

(2) menu.tidx, mark.tidx: An information file of a thumbnail picture.

(3) menu.tdat, mark.tdat: A file storing a thumbnail picture.

(4) #####.rpls, #####.vpls (##### is an arbitrary number): A file storing information of a PlayList.

(5) %%%%%.clpi (%%%%% is an arbitrary number): A file storing information of a Clip.

(6) %%%%%.m2ts: A file storing a stream.

(%%%%% is such a number as establishes a one-to-one correspondence of each m2ts file with a clpi file.)

A directory is provided on a disk, and a range under the directory is managed by a recording and reproducing system. /DVR may exist in a root directory of the disk or under a certain directory. As shown in FIG. 4, a directory /DVRn (n is an integer of more than 1) may exist as a directory for extension at the same level where /DVR exists. A structure under /DVRn is identical with that of /DVR, and therefore only the structure under /DVR will be described in the following.

Files info.dvr, menu.tidx, menu.tdat, mark.tdix, and mark.tdat are placed under the /DVR directory. Also directories /PLAYLIST, /CLIPINF, /STREAM, and /DATA are placed under the /DVR.

Files #####.rpls and #####.vpls are placed under /PLAYLIST. %%%%%.clpi is placed in /CLIPINF. %%%%%.m2ts is placed in /STREAM.

There is only one file info.dvr under /DVR. A structure of info.dvr is represented by a syntax of FIG. 4. A block is formed for each piece of information with a different function within the file. A version number stores a version of the info.dvr file. Information under the directory is stored in UIAppInfoDVR( ). Information on a list of Playlists is stored in TableOfPlayLists( ). Information unique to a manufacturer of the recording and reproducing apparatus is stored in MakersPrivateData( ). Addresses indicating the head of these blocks are described in a head portion of the file. For example, a TableOfPlayLists_Start_address indicates a position where the TableOfPlayLists( ) starts by a relative number of bytes within the file.

A structure of the UIAppInfoDVR( ) is represented by a syntax of FIG. 5. A length indicates in bytes a length from a field immediately after the length to an end of the UIAppInfoDVR( ). A DVR_character_set indicates a character set of a character string described in a file under the DVR directory. For example, it indicates an encoding method of a character string recorded in a DVR_name field within the UIAppInfoDVR( ). As the encoding method, ASCII, Unicode or the like can be selected. A DVR_protect_flag as a control signal is a flag that indicates whether contents under the DVR directory may be shown to a user without limitation. In a case where the flag is set to 1, contents under the directory can be shown to the user only when the user can input a correct PIN (Personal Identification Number) number (PIN in FIG. 5) as a code number. When the flag is set to 0, the contents can be shown to the user without the user inputting the PIN number. The above is reproduction limitation on the directory. Reproduction limitation on each individual PlayList is specified by a playback_control_flag defined in a UIAppInfoPlayList( ) of FIG. 8 to be described later. Details of reproduction control and reproduction limitation will be described later.

A resume_valid_flag indicates whether a resume function for specifying a PlayList to be reproduced first when starting reproduction of the DVR directory is enabled or disabled.

When the flag is 1, a PlayList specified by a resume_PlayList_file_name is treated as a PlayList to be reproduced first. The resume function is expected to be used when reproduction is to be resumed at a position where viewing last time was stopped, for example.

A PIN is four numbers each from 0 to 9. The PIN indicates a code number required when reproduction control is enabled. Each number is encoded in accordance with ISO/IEC646. A ref_to_menu_thumbnail_index is a region for, when there is a thumbnail representing the directory, storing a thumbnail number identifying the thumbnail. A thumbnail having a thumbnail_index specified by the ref_to_menu_thumbnail_index is a menu thumbnail representing the directory (in the present invention, a still picture representing the directory, in particular, is referred to as a menu thumbnail).

A DVR_name_length indicates length in bytes of a DVR directory name indicated by a DVR_name. A number of bytes corresponding to the DVR_name_length from the left in this field form a valid character string, which indicates the name of the directory. In the DVR_name field, a byte string following the valid character string indicated by the DVR_name_length may contain any value.

FIG. 6 shows syntax of the TableOfPlayLists( ). A number_of_PlayLists indicates a number of PlayLists in the directory, and a list of PlayLists in a subsequent loop indicates an order of PlayLists displayed on a menu screen. A PlayList_file_name specifies a file name such as #####.rpls, #####.vpls or the like. A PlayList is specified by the file name.

Files #####.rpls and #####.vpls are present under /PLAYLIST. One file is in a one-to-one correspondence with each PlayList. FIG. 7 shows a structure of #####.rpls and #####.vpls. A block is formed for each piece of information with a different function within the file. A UIAppInfoPlayList( ) stores attribute information about the PlayList. A PlayList( ) stores information on PlayItems forming the PlayList. A PlayListMark( ) stores information on marks attached to the PlayList. A MakersPrivateData( ) stores information unique to a manufacturer of the recording and reproducing apparatus that recorded the PlayList file. A 32-bit address (PlayListMark_start_address or the like) indicating the head of a block is described in a head portion of the file. This enables a padding word to be inserted at the front or the rear of a block. However, a starting position of the UIAppInfoPlayList( ) or a first block in the file is fixed at a 256th byte from the head of the file.

The UIAppInfoPlayList( ) of FIG. 8 stores the attribute information about the PlayList, which information is not directly required for reproduction of the PlayList. Specifically, the following information is stored.

PlayList_character_set: Specifies a character set of character string information about the PlayList.

playback_control_flag: When this flag as a control signal is 1, a thumbnail and other information of the PlayList cannot be displayed onto a menu and the PlayList cannot be reproduced unless the PIN is inputted.

write_protect_flag: An erase prohibiting flag. When this flag is 1, a user interface that prohibits a user from easily erasing the PlayList is required.

is_played_flag: A flag indicating that the PlayList has already been reproduced.

archive: A flag indicating that the PlayList is a non-copy, original PlayList.

record_time_and_date: A date and time of recording of the PlayList.

PlayList_duration: Reproduction time of the PlayList.

maker_ID: A number identifying a manufacturer of the recorder that last updated the PlayList is written.

maker_model_code: A number identifying the recorder that last updated the PlayList is written.

ref_to_thumbnail_index: Specifies a thumbnail as a representative picture of the PlayList. A thumbnail having a thumbnail_index specified by the ref_thumbnail_index is a menu thumbnail representing the PlayList.

channel_number: Stores a channel number of a recorded stream.

channel_name_length, channel_name: Stores a channel name. In the channel_name field, a character string of a length specified by the channel_name_length is valid. The same goes for a PlayList_name and a PlayList_detail.

PlayList_name_length, PlayList_name: Stores a PlayList name.

PlayList_detail_length, PlayList_detail: Stores detailed information of the PlayList.

Contents of the block PlayList( ) are as shown in FIG. 9. A length indicates in bytes a length from a field immediately after the length to an end of the PlayList( ). A CPI_type indicates a type of CPI (Characteristic Point Information) possessed by the PlayList. A number_of_PlayItems indicates the number of PlayItems forming the PlayList. A number_of_SubPlayItems indicates the number of PlayItems (SubPlayItems) for post-recording audio attached to the PlayList. A PlayItem( ) stores information of a PlayItem. A SubPlayItem( ) stores information of a SubPlayItem. The syntax is such that only when the PlayList is a Virtual PlayList and a certain condition is satisfied, the PlayList can have a SubPlayItem.

Contents of the block PlayItem( ) are as shown in FIG. 10. A Clip_Information_file_name stores, in a form of a character string, a file name of a Clip information file (file with the extension clpi) in one-to-one correspondence with a Clip that the PlayItem refers to. A connection condition is information indicating a connection between the PlayItem and a next PlayItem, or indicating whether reproduction can be performed with no seam between the PlayItems. A ref_to_STC_id specifies a STC_sequence (STC: System Time Clock) within a Clip. The STC_sequence indicates a continuous range of PCR (Program Clock Reference) serving as a reference for a time base of an MPEG-2 TS, and is assigned a STC_id as a unique number within the Clip. Since a consistent, continuous time base can be defined within the STC_sequence, a start time and an end time of the PlayItem can be set uniquely. That is, the start point and the end point of each PlayItem must be present in the same STC_sequence.

An IN_time indicates a pts (presentation time stamp) of the start point of the PlayItem on the STC_sequence. An OUT_time indicates a pts of the end point of the PlayItem on the STC_sequence.

Figure 11:
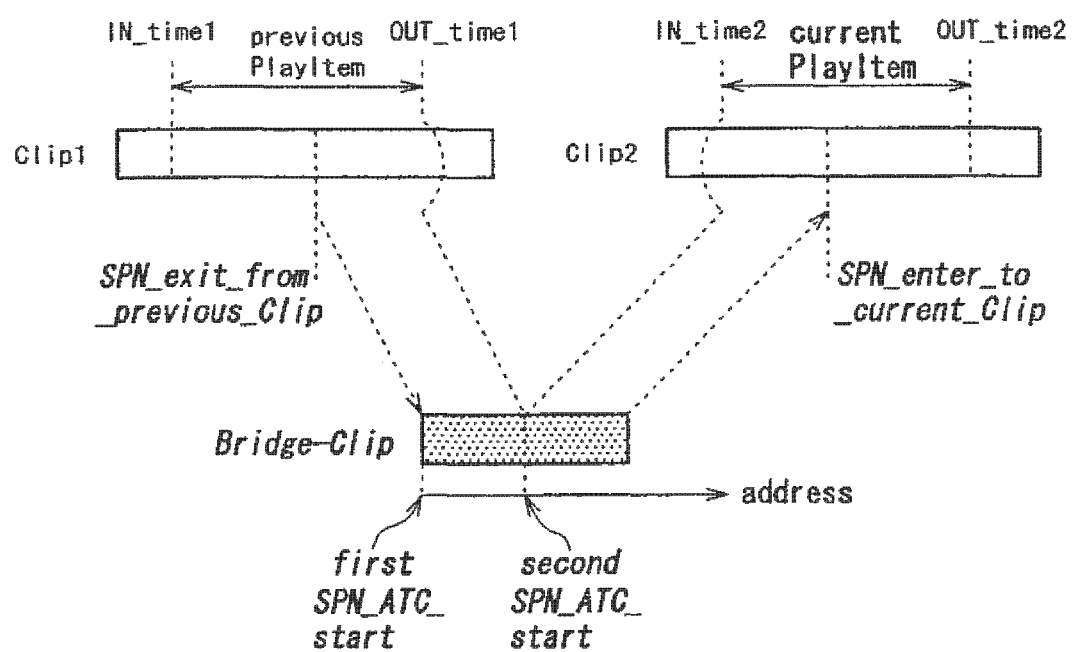
FIG. 11 is a diagram of assistance in explaining Bridge_sequence/Bridge_Clip.

A BridgeSequenceInfo( ) stores information on a bit stream (Bridge_sequence, Bridge-Clip) created in realizing a function of seamlessly reproducing PlayItems by jumping to a bit stream different from the bit streams to be reproduced originally at a seam portion of the PlayItems and reproducing the bit stream instead, as shown in FIG. 11.

The PlayListMark( ) of FIG. 12 is a data structure storing information of marks that enable setting of a search point in the PlayList and provision of a structure for dividing the PlayList such as a chapter.

FIG. 13 is a diagram of assistance in explaining marks. A mark indicates an arbitrary reproduction time on a PlayList or a Clip. The PlayList can be provided with a bookmark, which is a mark having a function as of a bookmark, a resume mark indicating a point where next reproduction is desired to be started, and the like. The data structure storing the marks of the PlayList is represented by the PlayListMark( ).

The Clip can be provided with a commercial mark indicating a commercial part of a television broadcast, and a scene mark indicating a characteristic scene. The marks of the Clip can also be used from a PlayList referring to the Clip. When there are a plurality of PlayLists referring to the same part on the Clip, common marks of the Clip appear in each of the PlayLists. A data structure storing the marks of the Clip is represented by a ClipMark( ).

One %%%%%.clpi file is created under /CLIPINF in correspondence with each AV stream file %%%%%.m2ts. FIG. 14 shows a structure of %%%%%.clpi. A block is formed for each piece of information with a different function within the file. A ClipInfo( ) stores information on the Clip. A SequenceInfo( ) stores information on a discontinuity point of PCR (Program Clock Reference) representing a time base of a transport stream in MPEG-2 systems. A ProgramInfo( ) stores information on a program in MPEG-2 systems. A CPI( ) stores information on CPI (Characteristic Point Information) indicating a characteristic point such as a random access start allowing point or the like in the AV stream. A ClipMark( ) stores information of marks of a search index point, a start point and an end point of a commercial and the like which marks are attached to the Clip. Addresses indicating the head of these blocks are described in a head portion of the file.

An outline of data structure of a DVR format has been described above. Such data structure allows a PlayList to be constructed with a sequence of PlayItems that specify a part desired to be reproduced in an AV stream by a set of an IN point and an OUT point, and allows a combined reproduction unit perceived by a user to be managed. Incidentally, a directory DATA in FIG. 1 is provided for future extension of functions.

Information on reproduction control will next be described. The information on reproduction control in the present invention is:

(1) the PIN and the DVR_protect_flag in the file info.dvr (FIG. 3, FIG. 4, and FIG. 5) and (2) the playback_control_flag in the file #####.rpls or #####.vpls (FIG. 3, FIG. 7, and FIG. 8).

By defining meanings and operations of the player when the above flags are combined in an operation rule, it is possible to construct a new user interface as a video recorder. This is an object of the present invention. It is to be noted that reproduction control can be writing control depending on operation, and therefore the following description includes that of writing.

Reproduction control possible in a recorder using a removable recording medium is divided into a reproduction control physically set on the recording medium and a reproduction control set by information recorded within the disk. The reproduction control physically set on the recording medium (disk) affects the entire disk. In a case of a recording medium with a cartridge, for example, a write disable switch attached to the cartridge can be operated to set the entire disk to a write disable state. In many cases, this setting can be changed without a code number.

When the information on reproduction control is recorded as data on the disk, on the other hand, the reproduction control can be effected in smaller units than a disk unit. Description in the following will be made of flags for recording such information on reproduction control as data on the disk.

Each PlayList has a 1-bit playback_control_flag (FIG. 8). First of all, an active playback_control_flag means that the PlayList cannot be reproduced. Further, when regarded as a flag for controlling visibility of the PlayList on a menu screen displaying a list of PlayLists, the playback_control_flag can be utilized as a flag for specifying whether the PlayList can be displayed on the menu screen or not. The visibility of the PlayList specifically means whether a thumbnail as a representative picture of the PlayList and the PlayList name are displayed on the menu screen or not. By not showing the PlayList name, the thumbnail, and detailed information on the menu screen and thereby preventing a user from selecting the PlayList, it is consequently possible to create a state in which the user cannot reproduce the PlayList. There are a few methods for preventing the PlayList from being selected. One method is to prevent a user from selecting the PlayList having an active playback_control_flag by a cursor. There is another method in which no PlayLists having an active playback_control_flag are displayed on the menu list but the user is informed of presence of hidden PlayLists by displaying information indicating the presence of the hidden PlayLists on the menu screen. There is yet another method that does not display real PlayList names and thumbnails, that is, displays all PlayLists on the menu list but brings the PlayList name of a PlayList having an active playback_control_flag into a hidden state such as "****" (hereinafter referred to as display in hidden characters).

In any case, the above managements are required because reproduction control to such a degree that "a real PlayList name is visible but reproduction is not possible when it is actually selected" allows the contents to be guessed from the PlayList name, which is not sufficient for reproduction control.

Attention should be given to display of remaining capacity. It is of course necessary to display the remaining capacity or recordable time including PlayLists hidden from the user. When there are hidden PlayLists, apparent remaining capacity obtained by subtracting capacity occupied by PlayLists visible from the user from a total capacity of the disk is larger than real remaining capacity. This confuses the user, and therefore the correct remaining capacity including capacity occupied by not only the displayed PlayLists but also the hidden PlayLists needs to be displayed on the menu screen.

The combination of the DVR_protect_flag of the info.dvr and the playback_control_flag of the PlayList will next be considered. The flags are each a 1-bit flag, and hence there are four possible combinations. Then conditions as shown in FIG. 15 result.

In the following, the four combinations will be described in order.

(A) is a case where the flags of both a directory and all PlayLists are not active. In this case, nothing is prevented from being reproduced under the DVR directory, and therefore when the DVR directory is selected after insertion of the disk, all the PlayLists are displayed on a menu screen. That is, in this case, reproduction is not limited. This combination is suitable when the user uses the disk by himself/herself.

(B) When only the DVR_protect_flag is active, reproduction of the directory is set to be disabled. In this condition, the following uses are expected. [0111] The disk is desired to be for exclusive use of the user so that no other person can see the disk. [0112] The disk is used as a multi-user disk.

When there is only one directory on the disk, disabling the reproduction of the directory means disabling the reproduction of the entire disk. When only one user uses the disk, viewing limitation is expected to be effected by this method. On the other hand, this flag can be used to realize a multi-user disk. A plurality of directories are provided on the disk, and an owner of each of the directories is determined. When the disk having the plurality of directories is inserted into a player/recorder, the player/recorder first displays a screen for directory selection (folder selection). A user selects a directory owned by the user. At this time, when the DVR_protect_flag is active, the user is required to input a code number. When a correct code number is inputted, a list of PlayLists under the directory is displayed. Setting the code number prevents other persons from viewing the directory of the user and also eliminates the risk of other persons erasing the PlayLists under the directory of the user.

(C) is a condition in which the DVR_protect_flag is inactive and the playback_control_flag is active.

Considering the operation of the player/recorder in this case, when the directory is selected immediately after the disk is inserted into the player/recorder, the user is not required to input the code number because the DVR_protect_flag is inactive. The player/recorder needs to display only PlayLists with an inactive playback_control_flag on a menu screen by filtering. A PlayList with an active playback_control_flag does not appear on the menu screen or is displayed as a PlayList with a hidden PlayList name.

In a case of a user interface that displays presence of hidden PlayLists, when the PIN is inputted, all PlayLists are displayed on a list. There may be a user interface that displays a PlayList having an active playback_control_flag on the menu screen without its correct PlayList name and details. In this case, when the PlayList having the active playback_control_flag is selected to be reproduced, the user is prompted to input the PIN. When the correct PIN is inputted, all PlayLists are then displayed with real names thereof on the menu screen.

Thus, (C) can be used when unnecessary PlayLists are not desired to be displayed in personal use or when the disk is given to another person and only PlayLists desired by the creator to be shown are to be displayed on the menu screen, for example.

(D) is a condition in which both the DVR_protect_flag and the playback_control_flag are active. When the management of (D) is a mere combination of the managements of (B) and (C), the code number needs to be inputted twice, or at the time of directory selection and at the time of PlayList selection. This is not convenient for a user. Hence, when reproduction is allowed by inputting the code number only once at the time of directory selection only in the case of (D), an easy-to-use user interface is realized. This is generalized to the following: "the PIN needs to be inputted once or more to reproduce or erase a PlayList with an active playback_control_flag."

The above uses of the PIN are summarized as follows.

Effective Range of PIN

One PIN can be set in each DVR directory, and the PIN is a code number common to both the DVR_protect_flag and the playback_control_flag under the DVR directory.

Determining Effectiveness of PIN

The PIN is effective when a value of a logical sum ("OR") of the DVR_protect_flag and all the playback_control_flags within the directory is "1." This needs to be checked not only at the time of reproduction but also at the time of erasing a directory or erasing the entire disk so as to prevent hidden PlayLists from being erased unnoticed.

Management of the Number of Inputs of PIN

The PIN needs to be inputted once or more to reproduce or erase a PlayList with an active playback_control_flag. That is, even when both the DVR_protect_flag and the playback_control_flag are active, the PIN does not need to be inputted twice, and may be inputted only once at the time of directory selection.

Figure 16:
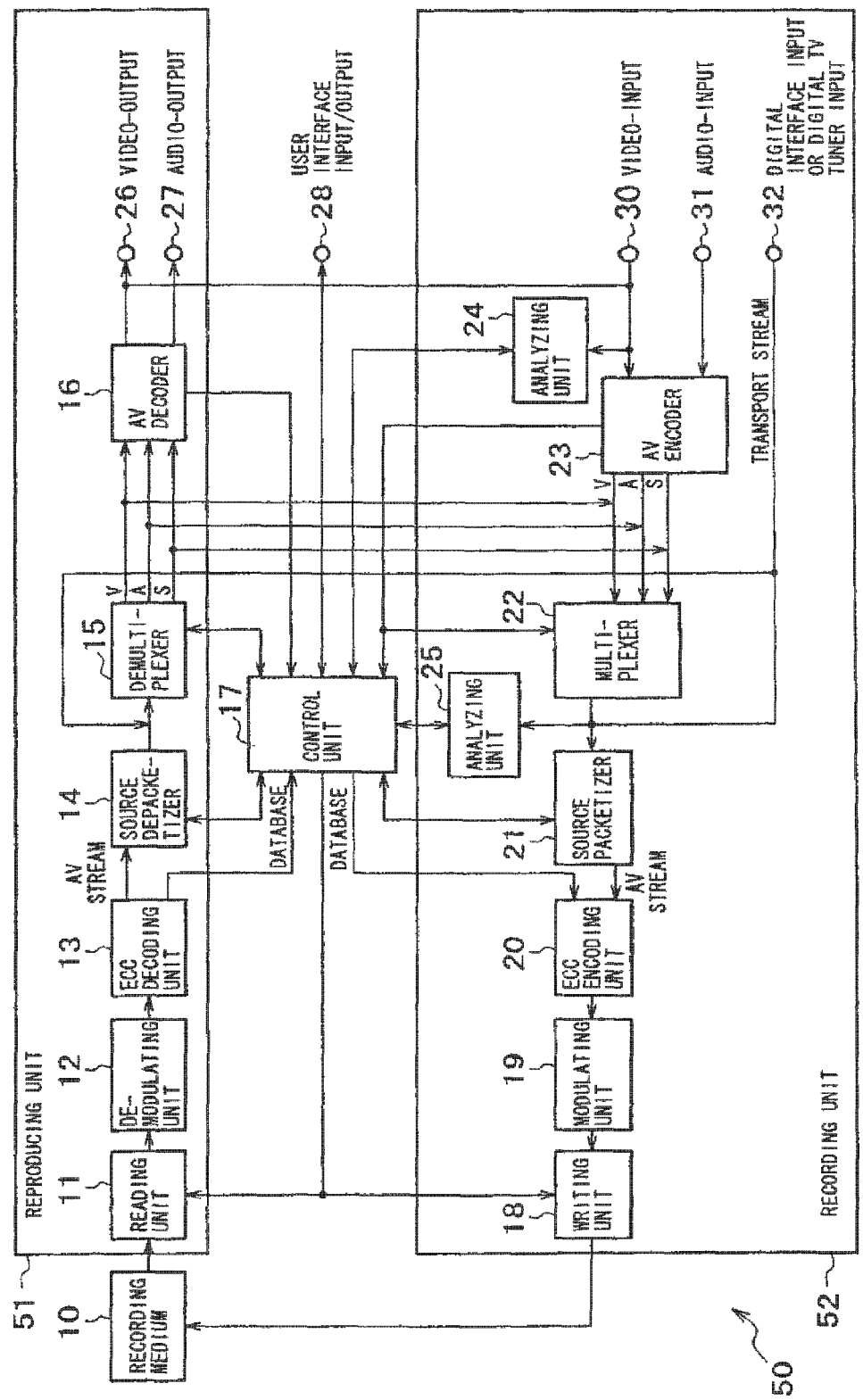
FIG. 16 is a block diagram showing a configuration of a moving image recording and reproducing apparatus.

FIG. 16 is a block diagram of a moving image recording and reproducing apparatus to which the present invention is applied. The moving image recording and reproducing apparatus 50 includes a reproducing unit 51 and a recording unit 52. Basic operation of the moving image recording and reproducing apparatus 50 will hereinafter be described.

Recording of AV Stream

Description will first be made of a case where an input audio-video signal is encoded and recorded. A video signal and an audio signal are inputted from a terminal 30 and a terminal 31, respectively. The video signal is inputted to an analyzing unit 24 and an AV encoder 23. The audio signal is also inputted to the AV encoder 23. The AV encoder 23 encodes the input video signal and audio signal, and then outputs an encoded video stream (V), an encoded audio stream (A), and system information (S) for AV synchronization and the like to a multiplexer 22.

The encoded video stream is an MPEG2 video stream, for example. The encoded audio stream is for example an MPEG1 audio stream, a Dolby AC3 audio stream or the like.

The multiplexer 22 multiplexes the input streams on the basis of the input system information, and then outputs a multiplexed stream. The multiplexed stream is an MPEG2 transport stream or an MPEG2 program stream, for example. The multiplexed stream is inputted to an analyzing unit 25 and a source depacketizer 21. The source depacketizer 21 encodes the input multiplexed stream into an AV stream comprising source packets in accordance with an application format of a recording medium. The AV stream is processed by an ECC (error correction) encoding unit 20 and a modulating unit 19, and then inputted to a writing unit 18. The writing unit 18 records the AV stream file onto the recording medium (disk) 10 on the basis of a control signal from a control unit 17.

Description will next be made of a case where a transport stream of a digital TV broadcast or the like inputted from a digital interface or a digital TV tuner is recorded. A transport stream is inputted from a terminal 32. There are two methods for recording the input transport stream: a method that transparently records the transport stream and a method that re-encodes and then records the transport stream for a purpose of lowering a recording bit rate or the like. Information specifying the recording method is inputted from a user interface to the control unit 17 via a terminal 28, whereby the control unit 17 controls the recording method.

When the input transport stream is to be recorded transparently, the transport stream is inputted to the analyzing unit 25 and the source depacketizer 21. Processing thereafter until an AV stream is recorded onto the recording medium 10 is the same as in the above case of encoding and recording the input audio signal and video signal.

When the input transport stream is re-encoded and recorded, the input transport stream is inputted to a demultiplexer 15. The demultiplexer 15 inputs a video stream (V) to an AV decoder 16. The AV decoder 16 decodes the video stream, and then inputs a reproduced video signal to the AV encoder 23. The AV encoder 23 encodes the input video, and then inputs an encoded video stream (V) to the multiplexer 22. On the other hand, an audio stream (A) and system information (S) outputted from the demultiplexer 15 are inputted directly to the multiplexer 22. The multiplexer 22 multiplexes the input streams on the basis of the input system information, and then outputs a multiplexed stream. Processing thereafter until an AV stream is recorded onto the recording medium 10 is the same as in the above case of encoding and recording the input audio signal and video signal.

Recording of Application Database

The recording and reproducing apparatus 50 records an AV stream file and also records application database information describing the file. The application database information is created by the control unit 17. Information inputted to the control unit 17 is moving image characteristic information from the analyzing unit 25, AV stream characteristic information from the analyzing unit 25, and user instruction information inputted from the terminal 28.

The moving image characteristic information from the analyzing unit 25 relates to a characteristic image in an input moving image signal. For example, the moving image characteristic information is information (mark) specifying a program start point, a scene change point, a start point or an end point of a commercial or the like, and also includes a thumbnail of an image at the specified position.

The AV stream characteristic information from the analyzing unit 25 relates to information on encoding of an AV stream to be recorded. For example, the AV stream characteristic information includes address information of an I-picture within the AV stream, encoding parameters of the AV stream, information on a point of change of the encoding parameters in the AV stream, information (mark) related to a characteristic image in the video stream, and the like.

The user instruction information inputted from the user interface via the terminal 28 includes information specifying a desired reproducing section in the AV stream, characters describing contents in the reproducing section, information on a resume point or a bookmark set at a desired scene by the user, and the like.

On the basis of the above input information, the control unit 17 creates an AV stream database (Clip), a database of a PlayList formed by grouping reproducing sections (PlayItems) in the AV stream, information (info.dvr) for managing contents recorded on the recording medium, and thumbnail information. As with an AV stream, these pieces of database information are processed by the ECC (error correction) encoding unit 20 and the modulating unit 19, and then inputted to the writing unit 18. The writing unit 18 records a database file onto the recording medium 10 on the basis of a control signal from the control unit 17.

Reproduction

Operation at the time of reproduction will next be described. The AV stream file and the application database information are recorded on the recording medium 10.

First the control unit 17 instructs a reading unit 11 to read the application database information. The reading unit 11 reads the application database information from the recording medium 10. The database information is processed by a demodulating unit 12 and an ECC (error correction) decoding unit 12, and then inputted to the control unit 17.

On the basis of the application database, the control unit 17 outputs a list of PlayLists recorded on the recording medium (disk) 10 to the user interface via the terminal 28. The user selects a PlayList desired to be reproduced from the list of the PlayLists, and the PlayList specified for reproduction is inputted to the control unit 17. The control unit 17 instructs the reading unit 11 to read the AV stream file necessary for the reproduction of the PlayList. The reading unit 11 reads the AV stream from the recording medium 10. The AV stream is processed by the demodulating unit 12 and the ECC decoding unit 13, and then inputted to a source depacketizer 14.

The source depacketizer 14 converts the AV stream in the application format of the recording medium 10 into a stream that can be inputted to the demultiplexer 15. The demultiplexer 15 inputs to the AV decoder 16 a video stream (V), an audio stream (A), and system information (S) for AV synchronization and the like, which include a reproducing section (PlayItem) of the AV stream specified by the control unit 17. The AV decoder 16 decodes the video stream and the audio stream, and then outputs a reproduced video signal and a reproduced audio signal from a terminal 26 and a terminal 27, respectively.

When an instruction for random access reproduction or special reproduction is given by the user interface, the control unit 17 determines a position to read an AV stream from the recording medium 10 on the basis of contents of the AV stream database (Clip), and then instructs the reading unit 11 to read the AV stream. When a PlayItem selected by the user is reproduced from a time at a midpoint, for example, the control unit 17 instructs the reading unit 11 to read data of an I-picture having a time stamp closest to the specified time.

When an instruction for fast-forward playback is given by the user, the control unit 17 instructs the reading unit 11 to read I-picture data in the AV stream sequentially on the basis of the AV stream database (Clip).

The reading unit 11 reads the data from a specified random access point. The read data is processed by the demodulating unit 12, the ECC decoding unit 13, and the source depacketizer 14, then inputted to the demultiplexer 15, and decoded by the AV decoder 16, whereby AV data is reproduced.

Editing

Description will next be made of a case where the user edits an AV stream.

When the user desires to create a new reproduction path by specifying a reproducing section in an AV stream recorded on the recording medium 10; information of an IN point and an OUT point of the reproducing section is inputted from the user interface to the control unit 17 via the terminal 28. The control unit 17 creates a database of a group (PlayList) of reproducing sections (PlayItems) of AV streams.

When the user desires to erase a part of an AV stream recorded on the recording medium 10, information of an IN point and an OUT point of an erasing section is inputted from the user interface to the control unit 17 via the terminal 28. The control unit 17 changes the PlayList database to refer to only necessary AV stream portions. Also, the control unit 17 instructs the writing unit 18 to erase the unnecessary stream portion of the AV stream.

Seamless Editing

Description will be made of operation in a case where the user desires to create a new reproduction path by specifying a reproducing section in an AV stream recorded on the recording medium 10 and desires to connect reproducing sections seamlessly. In this case, the control unit 17 creates a database of a group (PlayList) of reproducing sections (PlayItems) of AV streams and may be required to perform partial re-encoding and re-multiplexing of a video stream around a point of connection between the reproducing sections.

First, information of an IN point picture and an OUT point picture of a reproducing section is inputted from the user interface to the control unit 17 via the terminal 28. The control unit 17 instructs the reading unit 11 to read data required to reproduce the IN point picture and the OUT point picture. The reading unit 11 reads the data from the recording medium 10. The data is passed through the demodulating unit 12, the ECC decoding unit 13, and the source depacketizer 14, and then inputted to the demultiplexer 15.

The control unit 17 analyzes a stream inputted to the demultiplexer 15, determines a re-encoding method (changing a picture_coding_type and assigning an amount of encoding bits for re-encoding) and a re-multiplexing method for the video stream, and then supplies the methods to the AV encoder 23 and the multiplexer 22.

Next, the demultiplexer 15 separates the input stream into a video stream (V), an audio stream (A), and system information (S). The video stream is "data inputted to the AV decoder 16" or "data inputted directly to the multiplexer 22." The former data is required to be re-encoded. The data is decoded by the AV decoder 16, and a decoded picture is re-encoded by the AV encoder 23 to become a video stream. The latter data is not re-encoded, and is copied from the original stream. The audio stream and the system information are inputted directly to the multiplexer 22.

The multiplexer 22 multiplexes the input streams on the basis of the information inputted from the control unit 17, and then outputs a multiplexed stream. The multiplexed stream is processed by the ECC (error correction) encoding unit 20 and the modulating unit 19, and then inputted to the writing unit 18. The writing unit 18 records the AV stream onto the recording medium 10 on the basis of a control signal from the control unit 17.

Directing attention to the DVR_protect_flag and the playback_control_flag, operation of the moving image recording and reproducing apparatus 50 after insertion of a disk (recording medium 10) will next be described with reference to flowcharts.

Figure 17:
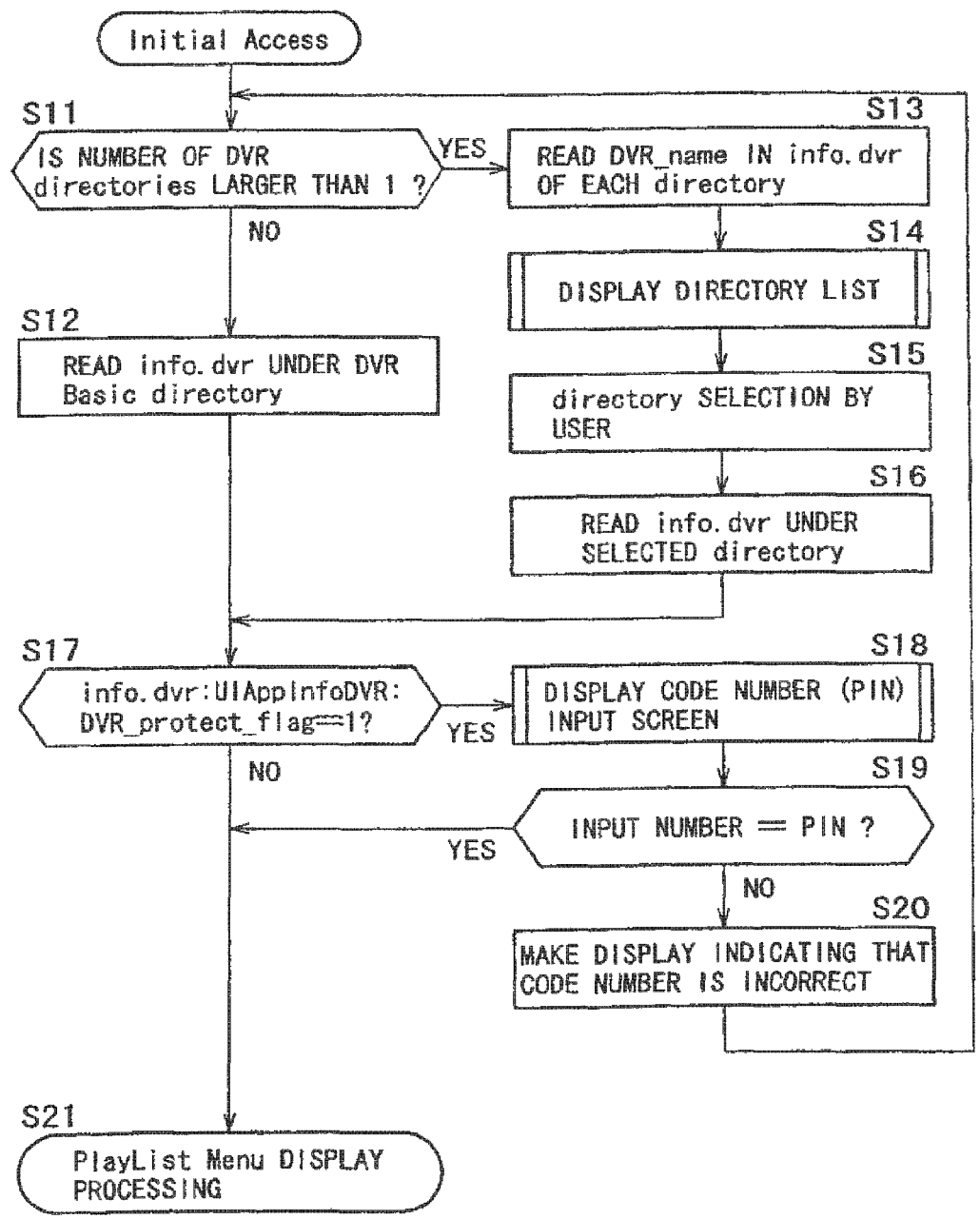
FIG. 17 is a flowchart of assistance in explaining operation of the apparatus in relation to a DVR_protect_flag at the time of initial reading.

FIG. 17 is a flowchart illustrating how the DVR_protect_flag is used at the time of insertion of the disk. It is to be noted that when the number of DVR directories is more than one, a list of directories is displayed to allow the user to select a directory having a list of PlayLists desired to be viewed. When the DVR_protect_flag is "1" (active), the user is prompted to input a code number. Processing for displaying the list of PlayLists can be started only when a correct code number is inputted.

Specifically, at a step S11, the control unit 17 determines whether the number of directories recorded on the recording medium 10 is more than one. When the number of directories is one, the processing proceeds to a step S12, where the control unit 17 reads info.dvr under the basic directory of the recording medium 10. That is, the info.dvr shown second from the top in FIG. 3 is read at the step S12.

When the control unit 17 determines at the step S11 that the number of directories is two or more, the processing proceeds to a step S13, where the control unit 17 reads a DVR_name described in the info.dvr of each of the directories (FIG. 4 and FIG. 5). At a next step S14, the control unit 17 performs processing for displaying a directory list. Specifically, the control unit 17 creates display data, and outputs the display data as a video output from the AV decoder 16 to a monitor not shown via the terminal 26 to display the display data. Thus, the read names of the directories are displayed in a list at this step.

Figure 18:
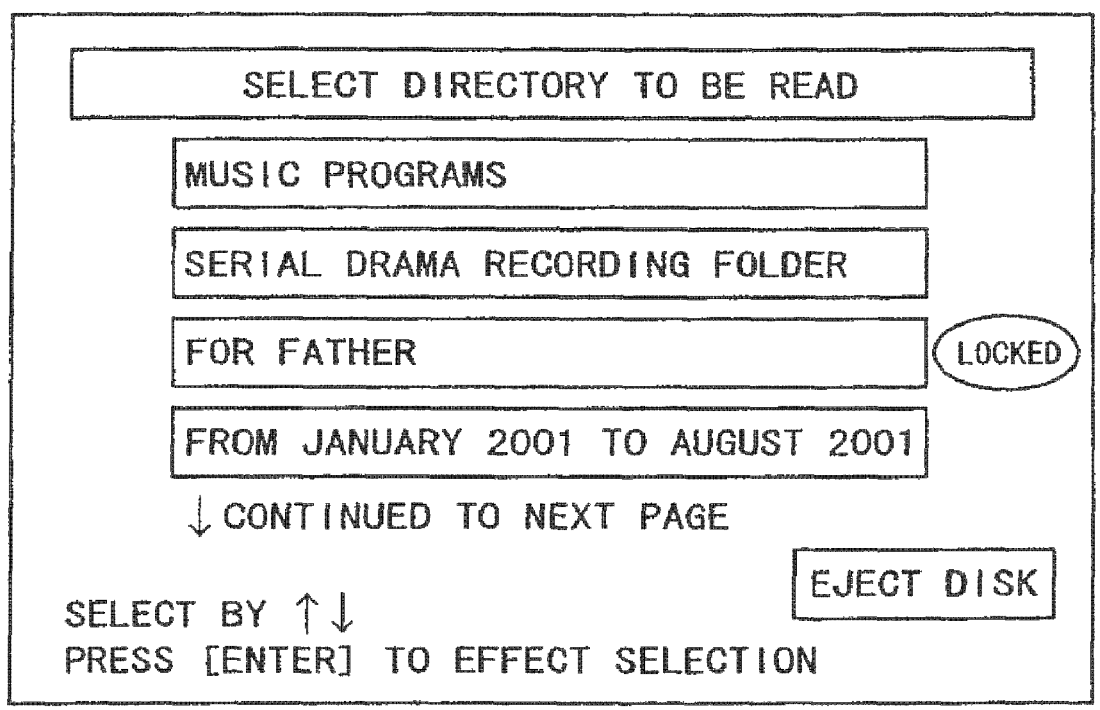
FIG. 18 is a diagram showing an example of a menu screen for directory selection.

FIG. 18 shows an example of display in this case. In this example, directories "MUSIC PROGRAM," "SERIAL DRAMA RECORDING FOLDER," "FOR FATHER," and "FROM JANUARY 2001 TO AUGUST 2001" are displayed. Of the directories, the directory "FOR FATHER" has an active DVR_protect_flag, and therefore characters "LOCK" is displayed. On the other hand, the directories "MUSIC PROGRAM," "SERIAL DRAMA RECORDING FOLDER," and "FROM JANUARY 2001 TO AUGUST 2001" each have an inactive DVR_protect_flag, and therefore the characters "LOCK" is not displayed.

The user performs operation to select a predetermined directory on the basis of the display of the directory list. A result of the operation is inputted from the user interface to the control unit 17 via the terminal 28. When the control unit 17 receives a command corresponding to the selection of the directory by the user at a step S15, the control unit 17 at a step S16 reads info.dvr under the selected directory on the basis of the command received at the step S15. When the directory "FOR FATHER" is selected, for example, info.dvr of "FOR FATHER" is read.

After the processing at the step S12 or the step S16, the control unit 17 proceeds to a step S17 to determine whether the DVR_protect_flag is 1 or not. As described above, the DVR_protect_flag is described in the UIAppinfoDVR( ) (FIG. 5) of the info.dvr (FIG. 4).

When the DVR_protect_flag is 1 (when this flag is active), the processing proceeds to a step S18, where the control unit 17 performs processing for displaying a code number (PIN) input screen. Specifically, the control unit 17 displays a code number (PIN) input screen as shown in FIG. 19, for example. In this display example, a message reading "THIS DIRECTORY IS LOCKED. INPUT CODE NUMBER TO RELEASE LOCK." is displayed. The user inputs the code number assigned to the selected directory. As described above, this code number is formed by a four-digit number. In the example of FIG. 19, "1234" is inputted as the code number. When the user inputs the code number, the code number is inputted from the user interface to the control unit 17 via the terminal 28.

At a step S19, the control unit 17 determines whether or not the input number is equal to the PIN (FIG. 5) registered in correspondence with the directory. When the input number is not equal to the PIN, the processing proceeds to a step S20, where the control unit 17 makes a display indicating that the code number is not correct. Thereafter the processing returns to the step S11, and the processing from the step S11 on down is repeated.

When the control unit 17 determines at the step S17 that the DVR_protect_flag is not 1 (when this flag is inactive), and when the control unit 17 determines at the step S19 that the input number is equal to the PIN, the processing proceeds to a step S21, where the control unit 17 performs processing for displaying a PlayList menu. Examples of the PlayList menu displaying processing are shown in FIG. 20 and FIG. 21 to be described later.

Figure 20:
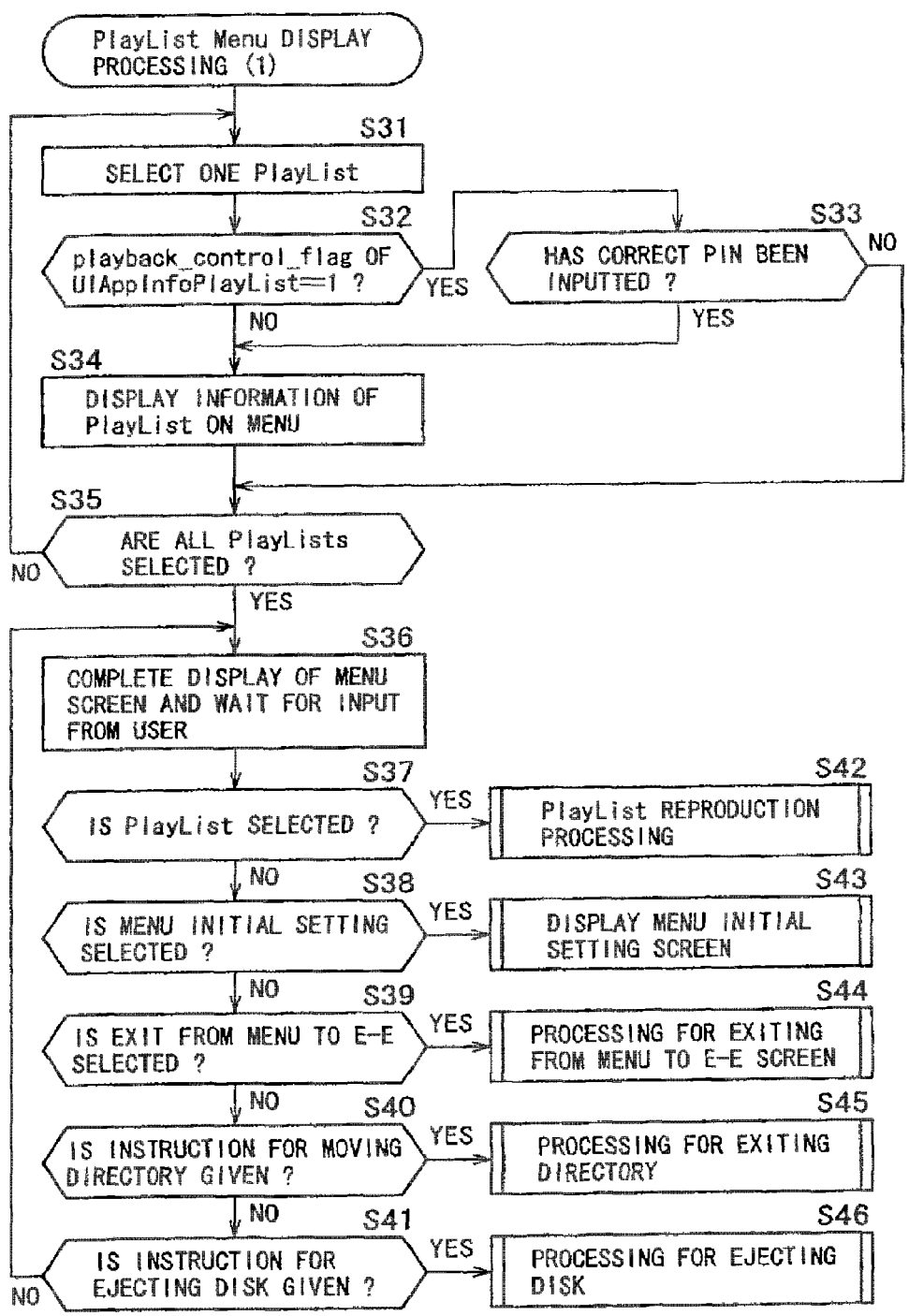
FIG. 20 is a flowchart of assistance in explaining processing to display of a PlayList menu.
Figure 21:
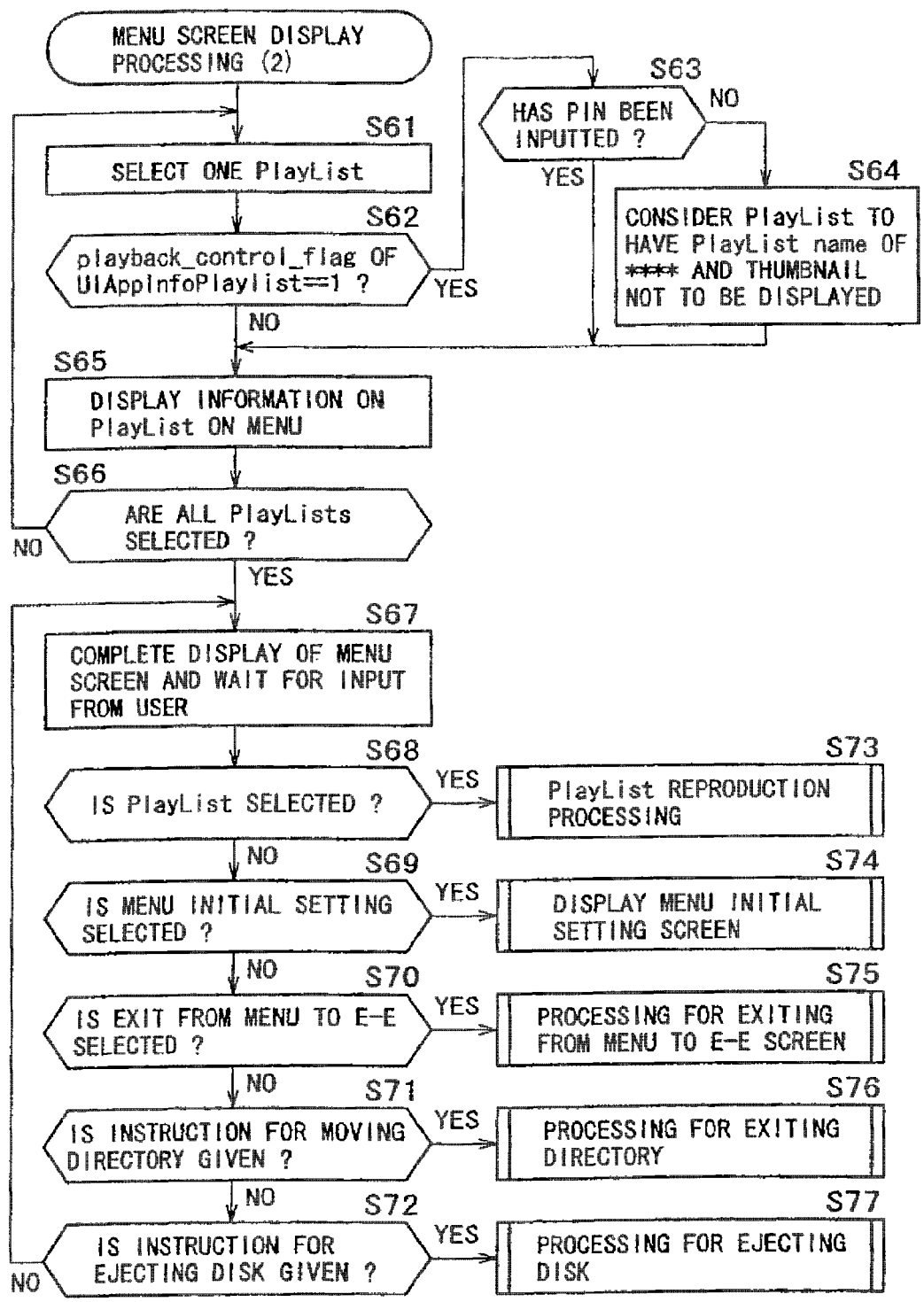
FIG. 21 is a flowchart of assistance in explaining other processing to display of a PlayList menu.

FIG. 20 is a flowchart of a first example of processing for displaying a PlayList menu. When there is a PlayList having an active playback_control_flag and the code number has not been inputted once, the PlayList is not displayed on the menu. When the code number is already inputted at the time of selecting the directory or on the PlayList menu, the PlayList can be displayed.

Specifically, at a step S31, the control unit 17 selects one PlayList (FIG. 7). At a step S32, the control unit reads an UIAppInfoPlayList( ) (FIG. 8) included in the PlayList (xxxxx.rpls or yyyyy.vpls) (FIG. 7) selected at the step S31, and determines whether a playback_control_flag included in the UIAppInfoPlayList( ) is 1 or not. When the flag is 1 (when the flag is active), the processing proceeds to a step S33, where the control unit 17 determines whether a correct PIN has been inputted or not. As described above, this processing is performed following the processing of FIG. 17. Hence, when the PlayList menu displaying processing of FIG. 20 is being performed after the processing at the steps S17, S18, and S19, the PIN has already been inputted. Thus, in this case, and in a case where it is determined at the step S32 that the playback_control_flag is not 1 (that the flag is inactive), the processing proceeds to a step S34, where the control unit 17 performs processing for displaying information on the PlayList on the menu. Thereby a name and the like of the PlayList are displayed.

When it is determined at the step S33 that the correct PIN has not been inputted, the processing at the step S34 is skipped.

The control unit 17 thereafter determines at a step S35 whether all PlayLists are selected or not. When there is a PlayList not selected yet, the processing returns to the step S31, and the processing from the step S31 on down is repeated.

When it is determined at the step S35 that all PlayLists are selected, the processing proceeds to a step S36, where the control unit 17 completes display of the menu screen. Then the control unit 17 waits for input from the user.

Specifically, the control unit 17 determines at steps S37 to S41 whether a PlayList is selected, whether menu initial setting is selected, whether an exit from the menu to E-E (Electric to Electric: a state that allows a signal from a tuner or an input terminal to be outputted as it is) is selected, whether a command for moving a directory is given, or whether a command for ejecting the disk is given. When any of these determinations is NO, the processing returns to the step S36, and the processing from the step S36 on down is repeated.

When it is determined at the step S37 that a PlayList is selected, the control unit 17 proceeds to a step S42 to perform PlayList reproduction processing. When it is determined at the step S38 that menu initial setting is selected, the control unit 17 proceeds to a step S43 to perform processing for displaying a menu initial setting screen.

When it is determined at the step S39 that an exit from the menu to E-E is selected, the processing proceeds to a step S44, where the control unit 17 performs processing for exiting the menu and performs processing for changing display to an E-E screen.

When it is determined at the step S40 that an instruction for moving a directory is given, the processing proceeds to a step S45, where the control unit 17 performs processing for exiting the directory.

When it is determined at the step S41 that a command for ejecting the disk (recording medium 10) is given, the processing proceeds to a step S46, where the control unit 17 performs processing for ejecting the disk.

FIG. 21 is a flowchart of a second example of processing for displaying a PlayList menu. The second example of processing is different from the processing of the flowchart of FIG. 20 in that when there is a PlayList having an active playback_control_flag and the code number has not been inputted once, the second example of processing puts the PlayList on the PlayList menu with a real name of the PlayList hidden and without a thumbnail picture. The user recognizes presence of the PlayList with the hidden name on the PlayList menu, and may select the PlayList. In such a case, the user is prompted to input the code number, and when the correct code number is inputted, the real name is displayed.

Specifically, at a step S61, the control unit 17 selects one PlayList. At a step S62, the control unit 17 determines whether a playback_control_flag corresponding to the PlayList is 1 or not. When the flag is 1 (when the flag is active), the processing proceeds to a step S63, where the control unit 17 determines whether a correct PIN has been inputted or not. The processing at the steps S61 to S63 is the same as the above-described processing at the steps S31 to S33 in FIG. 20.

When the control unit 17 determines at the step S63 that the PIN has not been inputted, the control unit 17 proceeds to a step S64 to display the PlayList name by ****. That is, the PlayList name is displayed in hidden characters. Also, the control unit 17 effects control so as not to display a thumbnail picture of the PlayList.

When it is determined at the step S63 that the PIN has been inputted, the processing at the step S64 is skipped.

When it is determined at the step S62 that the playback_control_flag is not 1 (when it is determined that the flag is 0), when it is determined at the step S63 that the PIN has been inputted, and when the processing at the step S64 is completed, the processing proceeds to a step S65, where the control unit 17 performs processing for displaying information on the PlayList on the menu. The control unit 17 thereafter determines at a step S66 whether all PlayLists are selected or not. When there is a PlayList not selected yet, the processing returns to the step S61, and the processing from the step S61 on down is repeated.

When it is determined at the step S66 that all PlayLists are selected, the processing proceeds to a step S67, where the control unit 17 completes the processing of displaying the menu screen. Then the control unit 17 waits for new input from the user.

The menu screen in this case is displayed as shown in FIG. 22, for example. In this display example, PlayLists "DRAMA," "PROFESSIONAL BASEBALL RELAY BROADCAST 50TH GAME," AND "FOREIGN-FILM THEATER" are displayed as PlayLists for reproduction, and a PlayList is displayed in hidden characters "* . . . ." Since the PlayList displayed in hidden characters has a playback_control_flag set at 1, reproducing the PlayList requires input of the PIN.

Subsequent processing at steps S68 to S77 is the same as the processing at the steps S37 to S46 in FIG. 20, and therefore its description will be omitted.

Figure 23:
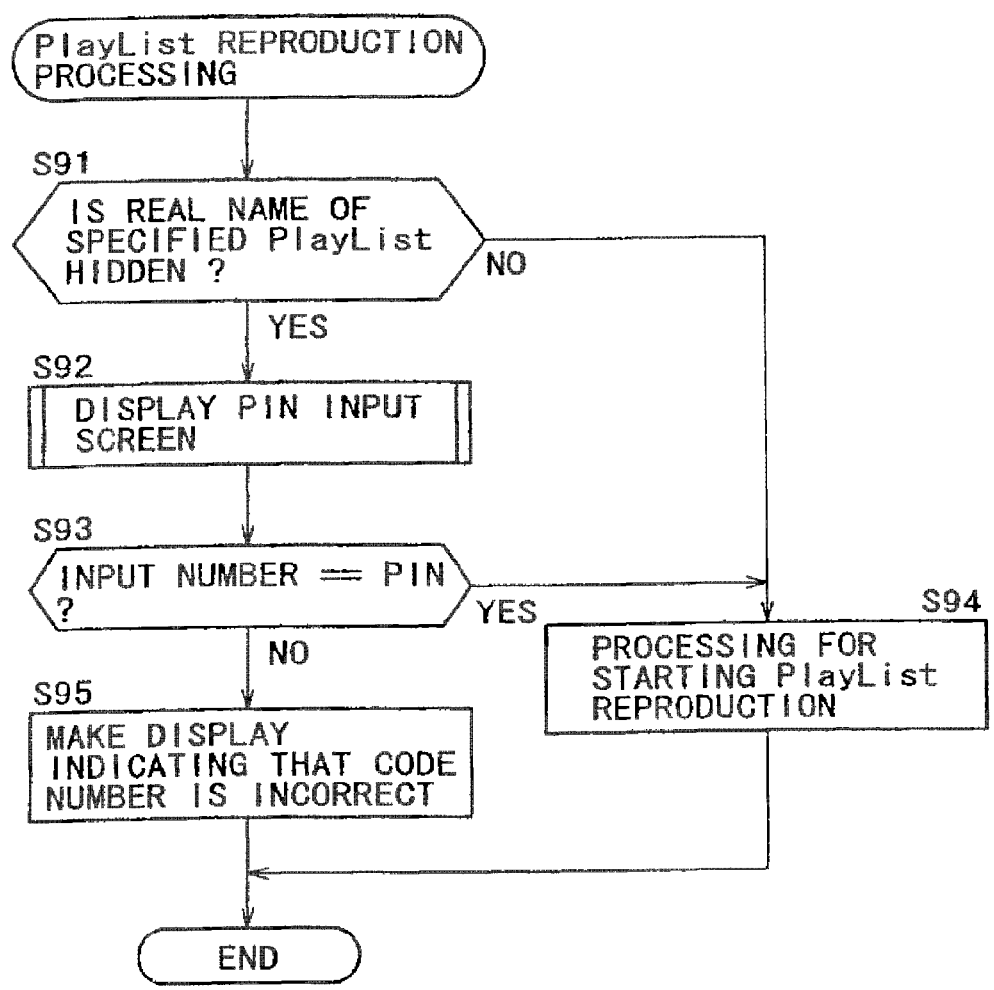
FIG. 23 is a flowchart of PlayList reproduction processing.

When it is determined at the step S68 that a PlayList is selected, the processing proceeds to the step S73 to perform PlayList reproduction processing. Details of the processing in this case are shown in a flowchart of FIG. 23.

Specifically, the control unit 17 determines at a step S91 whether or not the real name of the specified PlayList is hidden, that is, whether or not the PlayList is displayed in hidden characters. When the PlayList displayed in hidden characters is specified (when the third PlayList from the top in FIG. 22 is selected, for example), the processing proceeds to a step S92, where the control unit 17 displays a PIN input screen (a similar screen to that of FIG. 19 but a screen for input of the code number for releasing a lock to the PlayList rather than the directory).

On the basis of this display, the user inputs the code number, as in releasing the lock to the directory.

At a step S93, the control unit 17 determines whether the input number is equal to the PIN registered in correspondence with the specified PlayList. When the input number is not equal to the PIN, the processing proceeds to a step S95, where the control unit 17 makes a display indicating that the code number is not correct, and then the control unit 17 ends the processing. That is, in this case, since the code number is not correct, the user cannot reproduce the PlayList.

On the other hand, when it is determined at the step S91 that the real name of the specified PlayList is not hidden (when the PlayList with the name "DRAMA" at the top in FIG. 22 is selected, for example), and when it is determined at the step S93 that the input number is equal to the PIN, the processing proceeds to a step S94, where the control unit 17 starts processing for reproducing the specified PlayList.

Figure 24:
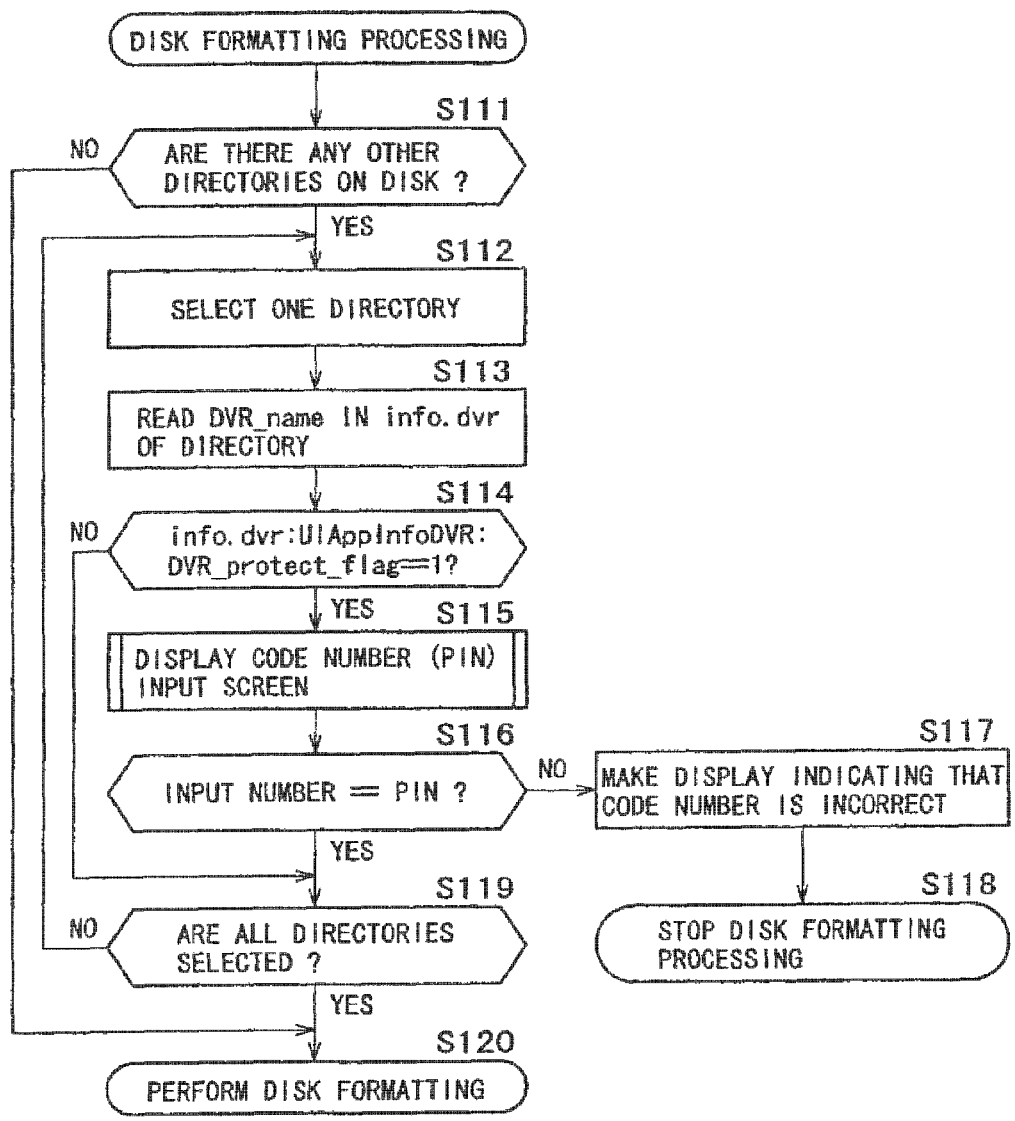
FIG. 24 is a flowchart of disk formatting processing.

FIG. 24 is a flowchart illustrating use of flags related to reproduction control in formatting the disk (totally erasing the disk). In order to prevent inadvertent deletion, when there is another directory on the disk and the code number (PIN) of the directory is effective, it is necessary to allow only a user knowing the code number to perform formatting. A recorder that does not implement processing of checking other directories and prompting for input of the code number "stops formatting" when there is even one other directory on the disk to be formatted. This can prevent an accident in which data in another directory which data is not intended to be erased is accidentally erased.

At a step S111, the control unit 17 determines whether there are other directories on the disk or not (recording medium 10). When there are other directories, the processing proceeds to a step S112, where the control unit 17 selects one directory. At a step S113, the control unit 17 reads a DVR_ name (FIG. 5) described in the info.dvr (FIG. 4) of the directory. At a step S114, the control unit 17 determines whether a DVR_protect_flag (FIG. 5) of the directory is 1 (active). When this flag is active, the processing proceeds to a step S115, where the control unit 17 displays a code number (PIN) input screen. Thus, the code number input screen as shown in FIG. 19 is displayed. On the basis of this input screen, a user inputs a code number.

At a step S116, the control unit 17 determines whether the number inputted by the user is equal to the PIN (FIG. 5) registered in correspondence with the directory. When the input number is not equal to the registered PIN, the processing proceeds to a step S117, where the control unit 17 makes a display indicating that the code number is not correct. The control unit 17 proceeds to a step S118 to stop the processing for formatting the disk.

On the other hand, when it is determined at the step S116 that the input number is equal to the PIN, the processing proceeds to a step S119. Also when it is determined at the step S114 that the DVR_protect_flag is not 1 (when it is determined that the DVR_protect_flag is 0), the processing proceeds to the step S119.

The control unit 17 determines at the step S119 whether all the directories are selected. When there is a directory not selected yet, the processing returns to the step S112, and the processing from the step S112 on down is repeated.

When it is determined at the step S119 that all the directories are selected, the processing proceeds to a step S120, where the control unit 17 formats the disk.

When it is determined at the step S111 that there are no other directories on the disk, the processing at the steps S112 to S119 is skipped, and the processing proceeds directly to the step S120 to format the disk.

Figure 25:
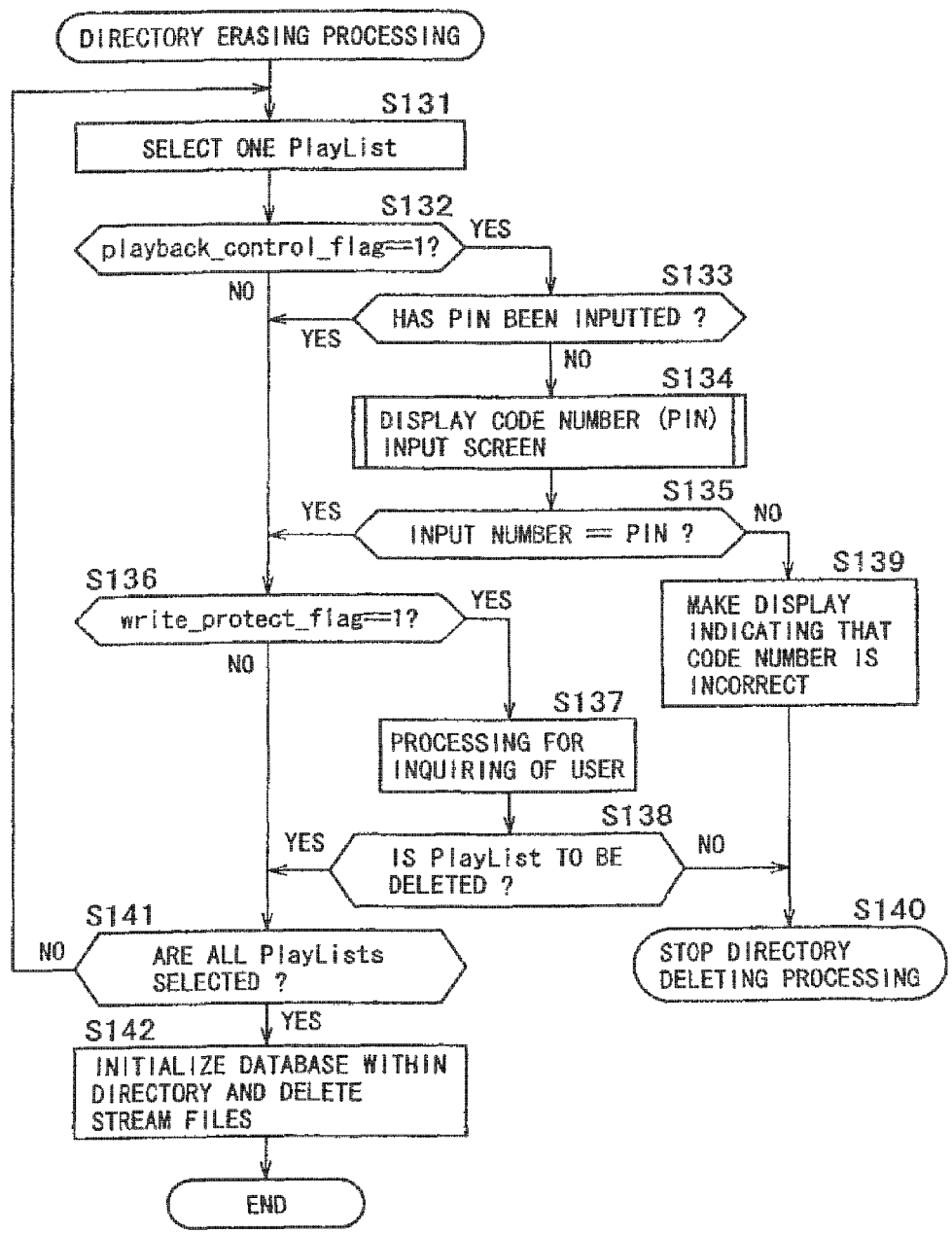
FIG. 25 is a flowchart of directory erasing processing.

FIG. 25 is a flowchart of processing for erasing an entire directory (erasing all PlayLists under a directory). The recorder that does not check for other directories at the time of formatting the disk can be said to replace the disk formatting function with directory erasure. In a case where a directory is to be erased and the PIN of the directory is effective, the PIN is required to be inputted so as to prevent the directory from being erased when there is a hidden PlayList. Also, when a write_protect_flag (a flag for prohibiting rewriting of a PlayList) of a PlayList is active, it is necessary to inquire of the user whether the PlayList may be erased. Since the write_protect_flag can be changed without inputting the PIN, it suffices to call attention to the user.

Specifically, at a step S131, the control unit 17 selects one PlayList. The control unit 17 determines at a step S132 whether the playback_control_flag (FIG. 8) of the selected PlayList is 1 or not. When the flag is 1 (when the flag is active), the control unit 17 proceeds to a step S133 to determine whether the PIN has already been inputted or not. When the PIN has not been inputted, the processing proceeds to a step S134, where the control unit 17 displays a screen for input of the code number. On the basis of this display, the user inputs the code number corresponding to the directory. The control unit 17 determines at a step S135 whether or not the number inputted by the user is equal to the PIN preregistered in correspondence with the directory. When the input number is not equal to the preregistered PIN, the processing proceeds to a step S139, where the control unit 17 makes a display indicating that the code number is not correct. At a step S140, the directory erasing processing is stopped.

When it is determined at the step S132 that the playback_ control_flag is not 1 (when it is determined that the playback_ control_flag is 0), when it is determined at the step S133 that the PIN has already been inputted, and when it is determined at the step S135 that the input number is equal to the PIN, the processing proceeds to a step S136, where the control unit 17 determines whether or not the write_protect_flag (FIG. 8) is 1 (whether the write_protect_flag is active). When the flag is active, the processing proceeds to a step S137, where the control unit 17 performs processing for inquiring of the user. Specifically, the control unit 17 displays for example a message to the user reading "Is this PlayList to be deleted?" and prompts for input of YES or NO.

The control unit 17 determines at a step S138 whether the PlayList is allowed to be deleted on the basis of a user input corresponding to the inquiring processing at the step S137. When an input of NO is received from the user, the control unit 17 proceeds to a step S140 to stop the directory deleting processing.

On the other hand, when an input of YES is received from the user, and when it is determined at the step S136 that the write_protect_flag is not 1 (when it is determined that the write_protect_flag is 0), the processing proceeds to a step S141, where the control unit 17 determines whether or not all PlayLists are selected. When there is a PlayList not selected yet, the processing returns to the step S131, and the processing from the step S131 on down is repeated. When it is determined that all PlayLists are selected, the processing proceeds to a step S142, where the control unit 17 performs processing for initializing databases within the specified directory and processing for deleting stream files.

incorporating the DVR_protect_flag and the playback_ control_flag as described above into standards and determining their use, it is possible to provide the user with finer reproduction control in a form easy for the user to understand and use.

INDUSTRIAL APPLICABILITY

With the recording medium reproducing apparatus and method according to the present invention, when first control information for controlling reproduction of information in each directory which information is recorded on a recording medium and second control information for controlling reproduction of each reproduction list belonging to the directory are both active, on the basis of input of a code number for either of the first control information and the second control information, input of the code number for the other control information is determined. Therefore a user is not required to input the code number twice, and thus operability can be improved.

The recording medium according to the present invention records first control information for controlling reproduction of recorded information in each directory, second control information for controlling reproduction of each reproduction list belonging to the directory, and a code number corresponding to each of a plurality of directories. Therefore, a plurality of users can share one recording medium while maintaining mutual confidentiality.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A reproducing apparatus, comprising:
   an input for inputting a code number; and
   a control unit for reproducing first control information in an info file for controlling reproduction of all of a plurality of playlists recorded on a recording medium, for reproducing second control information in a playlist for controlling reproduction of the playlist, and for permitting the reproduction of data, even when the first control information and the second control information are both active, if the inputted code number is consistent with a personal identification number (PIN) which is recorded in the info file, without requiring another input of the code number wherein the control unit controls display of information in a playlist and prohibits display of the information in the playlist when the first control information or the second control information is active.

2. A reproducing apparatus as claimed in claim 1, wherein the recording medium includes a plurality of directories and the code number is preset in each of the directories.

3. A reproducing apparatus as claimed in claim 1, wherein the control unit controls display of information in a playlist and displays the information in the playlist to prevent selection thereof when the first control information or the second control information is active.

4. A reproducing apparatus as claimed in claim 1, wherein the control unit controls display of information in a playlist and displays the information regarding the playlist as hidden characters when the first control information or the second control information is active.

5. A reproducing apparatus as claimed in claim 1, wherein the control unit controls display of information regarding a recordable capacity of the recording medium, and wherein, when selected information, in which associated first control information or second control information is active is recorded on the recording medium, the control unit controls display of the information regarding the recordable capacity such that the recordable capacity does not include a capacity occupied by the selected information.

6. A reproducing method, comprising:
   inputting a code number;
   reproducing first control information in an info file for controlling reproduction of all of a plurality of playlists recorded on a recording medium;
   reproducing second control information in a playlist for controlling reproduction of the playlist; and
   permitting the reproduction of data, even when the first control information and the second control information are both active, if the inputted code number is consistent with a personal identification number (PIN) which is recorded in the info file, without requiring another input of the code number, and
   controlling display of information in a playlist and prohibiting the display of the information in the playlist when the first control information or the second control information is active.

7. A system for processing information, the system comprising:
   a processor operable to execute instructions; and
   instructions for causing the processor to execute an reproducing method, the method including:
   inputting a code number,
   reproducing first control information in an info file for controlling reproduction of all of a plurality of playlists recorded on a recording medium,
   reproducing second control information in a playlist for controlling reproduction of the playlist, and
   permitting the reproduction of data, even when the first control information and the second control information are both active, if the inputted code number is consistent with a personal identification number (PIN) which is recorded in the info file, without requiring another input of the code number, and
   controlling display of information in a playlist and prohibiting the display of the information in the playlist when the first control information or the second control information is active.

* * * * *